US006819925B2

(12) United States Patent
Garland et al.

(10) Patent No.: US 6,819,925 B2
(45) Date of Patent: Nov. 16, 2004

(54) TELECOMMUNICATIONS CALL PROCESSING USING EXTERNALLY-ASSIGNED SUBSCRIBER CHARACTERISTICS

(75) Inventors: Stuart Mandel Garland, Morton Grove, IL (US); Lila Elizabeth Russ, Plainfield, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 647 days.

(21) Appl. No.: 09/732,405

(22) Filed: Dec. 7, 2000

(65) Prior Publication Data

US 2002/0072362 A1 Jun. 13, 2002

(51) Int. Cl.[7] .................................................. H04Q 7/20
(52) U.S. Cl. ............................. 455/432.1; 455/435.1; 370/329
(58) Field of Search .......................... 455/432.1, 432.3, 455/435.1, 435.2, 414.1, 432.2, 406, 436, 442, 433, 12.1, 415, 450; 370/329

(56) References Cited

U.S. PATENT DOCUMENTS

| | | | |
|---|---|---|---|
| 4,899,373 A | | 2/1990 | Lee ............................ 379/207 |
| 5,703,942 A | | 12/1997 | Pinard ........................ 379/207 |
| 5,706,211 A | * | 1/1998 | Beletic et al. .............. 709/206 |
| 5,821,983 A | | 10/1998 | Weiss .......................... 348/14 |
| 5,970,122 A | | 10/1999 | LaPorta et al. |
| 6,069,882 A | * | 5/2000 | Zellner et al. .............. 370/329 |
| 6,085,086 A | | 7/2000 | LaPorta et al. ............. 455/432 |
| 6,256,514 B1 | * | 7/2001 | Dent et al. .................. 455/561 |
| 6,282,202 B1 | * | 8/2001 | Mainwaring et al. ....... 370/410 |
| 6,330,443 B1 | * | 12/2001 | Kirby ...................... 455/432.2 |
| 6,546,243 B2 | * | 4/2003 | Tiedemann et al. ......... 455/419 |
| 6,617,980 B2 | * | 9/2003 | Endo et al. ................. 340/905 |

FOREIGN PATENT DOCUMENTS

| | | |
|---|---|---|
| WO | WO97/20422 | 6/1997 |
| WO | WO97/33421 | 9/1997 |

OTHER PUBLICATIONS

George Y, Liu, et al, "Efficient Mobility Management Support for Wireless Data Services", 1995 IEEE 45th vehicular Technology Conference, Jul. 25–28, 1995 Chicago, Illinois, pp. 902–906.

Seth Grimes, "Agents Come In From the Cold", *Database Programming & Design*, vol. 11, No. 4, Apr. 1998, pp. 49–53.

* cited by examiner

*Primary Examiner*—Lester G. Kincaid
*Assistant Examiner*—Nghi H. Ly
(74) *Attorney, Agent, or Firm*—Steven R. Santema

(57) ABSTRACT

A telecommunications system includes a telecommunications switching system, at least one subscriber terminal coupled to the switching system, at least one telecommunications agency coupled to the switching system. The agency stores subscriber information and provides the information to external requestors in the form of subscriber service images defining services and features to be provided for subscribers. The subscriber terminal includes a portable subscriber module identifying the subscriber and optionally contains information defining services and features to be provided for the subscriber by the subscriber terminal and the switching system. The switching system has a facility for storing all subscriber-related information as a plurality of transient subscriber service images defining the services and features to be provided for subscribers having pending or active calls. When the subscriber requests service, the agency or the portable subscriber module provide the image information to the switching system, which creates an image instance and provides the requested service. Once the service is concluded, the image instance is released.

30 Claims, 12 Drawing Sheets

TELECOMMUNICATIONS CALL PROCESSING USING EXTERNALLY-ASSIGNED SUBSCRIBER CHARACTERISTICS

FIELD OF THE INVENTION

This invention relates to telecommunications systems, and more particularly to telecommunications systems having facilities for call, session, and/or transaction processing using subscriber or line characteristics stored in a location remote from the switching facility handling the call.

BACKGROUND OF THE INVENTION

In recent years, telecommunications users have become both highly sophisticated service consumers and highly mobile. As a result, users desire the ability to take their telecommunications services with them wherever they go, and they desire that the user interface by which they access their services remain consistent at all times and in all locations.

In the years between the adoption of automated telephone switching and the wide application of stored-program telephone switching systems, telephone users within broad geographic regions experienced an extremely consistent user interface. Within the United States, for example, the procedures for making and receiving calls were consistent, so a person using a telephone away from home could expect to use the telephone in the same way, and could expect the telephone and telephone system to behave in the same ways, as at home. Telephone calling features were typically limited to placing calls by dialing a directory number and receiving calls by lifting the receiver when the telephone rang. Features which are now popular, such as "Call Waiting", "Call Forwarding", "Three-Way Calling", "Caller-ID", and the like, were not available.

At the same time, users understood that their telephone subscriptions (including any features and billing arrangements) were associated with their telephone "line" at a fixed location and did not expect access to that line or subscription when traveling. If access to telephone service was required while traveling, the traveler could use a pay telephone or could arrange with a host or hotel to make and receive calls using the host's or hotel's subscribed telephone service.

As telecommunications users have gained mobility and sophistication, users have desired that their subscribed telecommunications services be available wherever they may be located. Conventional public wireless telecommunications systems, including cellular and PCS wireless systems in North America and GSM wireless systems in Europe, have provided a partial but unsatisfactory solution. Conventional public wireless systems are not well integrated with private business communications systems, so that a user generally cannot use a public wireless terminal make and receive calls in the context of the private system. Such calls generally appear to originate from or terminate on the external public network. In addition, a wireless subscriber may carry a wireless terminal which can access services in a wide variety of locations, but access to service often depends on whether the subscriber's "home" telecommunications service provider directly serves the traveling subscriber's location, or whether the home provider has made a service arrangement with another provider that directly serves the location. Further, even when service providers offer network services that are marketed and billed consistently over wide geographic areas and for which no special charge is made for use away from a home system, the services are not necessarily provided by a homogeneous network infrastructure. Thus service and feature availability, and the user interface required to access these features, may differ from what is available to or experienced by the user when at the home or business location. Moreover, the "roaming" features of wireless telecommunications systems have generally been limited to wireless services, which historically have not enjoyed the variety, scope, reliability, and bandwidth of modern land-line telecommunications services.

Historically, switched telecommunications systems, including both land-line and wireless systems, have associated information defining the services, features, billing treatment, and the like, which will be provided to a user, with a user's telephone "line" or "subscription." Land-line systems generally have permitted a user to access services via the line solely at the customer premises at which the line is terminated (with the possible exceptions of call-forwarding and arrangements to bill to the user's own service calls made via a different line). Accordingly, the canonical information defining a user's service or subscription has conventionally been stored in a database that resides on the telephone switching system that serves the user's line, and is associated with that line. When calls are made to or from the user's line, the switching system typically may consult the database to determine the services, features, and billing treatment to be provided on that line and processes the calls accordingly. However, these services, features, and billing treatment have not necessarily been portable from one switching system type to another, and even if a second switching system type superficially supports the features and services of a first, interactions between the features and services may vary greatly.

Wireless telecommunications systems also historically have defined a user's service, feature, and billing treatment using database entries associated with a user's subscription or line. Although wireless systems do not provide a physical line or port with which the user's subscription is continually associated, the subscription (including services, features, and billing treatment) may be conceptually associated with a unique directory number or subscriber identifier and treated as a telephone line in a manner analogous to that of land-line systems. Conventional wireless systems typically store the database entries defining a user's subscription in a switching system or a Home Location Register (HLR) associated with the user's home wireless network. When a user accesses services remotely, some of the subscription information may be exported to the telecommunications switching system or a Visitor Location Register (VLR) serving the user's location and may then be used to process and bill calls.

Although the aforementioned wireless systems provide users some capabilities to access services remotely, they are incomplete and unsatisfactory. First, the remote access capabilities of wireless systems have not, as yet, been extended to land-line systems. In particular, land-line systems do not provide means for a user to identify herself or himself (or the associated subscription) to a remote telecommunications system and request that all services and features to which the user subscribes on a home system be delivered via the remote system.

Second, even in the wireless domain, services, features, and the user interface provided to a user at the remote location may vary significantly from those provided when the user is served by the home system. Variations in access to service, user interface, and feature availability and performance arise from a number of factors. Telecommunications switching equipment is produced by several different vendors, and although most equipment used in public networks provides a consistent set of basic services, the capabilities for advanced features and services, and the implementation of such features and services, varies among vendors and particular equipment models. Moreover, there are many telecommunications service providers and telecommunications regulatory authorities, each of which may specify aspects of features, services, and user interface, which aspects may vary according to their marketing plans, customer requirements, or the desires of their regulatory constituency. A feature or service, and the associated user interface, furnished by a particular telecommunications service provider, in a particular location, using particular equipment and operating software, may be identical, subtly different, profoundly different, or entirely unavailable from a different provider, or in a different location, or using different equipment or operating software.

Thus, when a user accesses a telecommunications service at a remote location, even though their subscription information, as recorded in the database of their home switching system or telecommunications network, specifies that they receive a particular service or feature, the service or feature may be unavailable or may perform in a manner different from what the user expects.

Although it might appear that the aforementioned disadvantages of existing telecommunications systems might be easily resolved by having all vendors and service providers agree to provide a common set of features and services, that solution is unlikely to be successful in the near term. Absent contrary regulatory constraints, service providers and vendors have used, and continue to use, product differentiation as a primary marketing tool. Also, the installed base of telecommunications equipment represents an extremely large investment. Rapid, wholesale replacement of the infrastructure equipment would be unfeasible, and upgrading all existing equipment to a common set of features would be difficult and expensive. Moreover, existing system architectures would not necessarily permit all variations of existing features to be provided on all equipment. Further, even for advanced models of telecommunications equipment, it is often not practical to install all available features on any field application of the equipment. Each feature or service furnished on the equipment has a non-negligible cost, and consumes equipment resources (e.g., storage) from a limited pool. Because of the interrelationships between various features and services, the resources required for each feature and service, as conventionally implemented, may grow non-linearly with the number of features and services present.

Further, the new development and implementation of a large, common set of telecommunications features, harmonizing the capabilities of equipment from many vendors and the requirements of many service providers, using conventional architectures and tools, would be prohibitively expensive and time-consuming. The architecture and programming models of telecommunications equipment vary among vendors and equipment models. Databases describing subscriber and line characteristics, which are typically resident on each switching system, vary greatly in structure and interpretation. Thus, as conventionally implemented, existing telecommunications systems have not provided telecommunications users the desired ability to take their telecommunications services with them wherever they go, while maintaining a consistent user interface at all times and in all locations, and it is unlikely this goal could be timely and feasibly accomplished using current architectures.

OBJECTS AND SUMMARY OF THE INVENTION

It is therefore an object of the present invention to provide a telecommunications system which minimizes the aforementioned disadvantages of prior art systems.

A telecommunications system constructed according to the present invention includes at least one subscriber terminal, a serving telecommunications exchange, a serving exchange image store, and a home telecommunications agency, interconnected using suitable network facilities, as described further.

The subscriber terminal may be a wired telephone, a wireless telephone, a data terminal, or any other device for providing an interface enabling a user to access the telecommunications system. The subscriber terminal preferably has a facility for operatively coupling to a Portable Subscriber Module (PSM), which uniquely identifies the subscriber to the subscriber terminal and to the home agency. Optionally, the PSM may also store information relating to services or features to which the subscriber has subscribed, for use by the subscriber terminal or the serving telecommunications exchange. The PSM and subscriber terminal must be selected for compatibility. Preferably, the PSM and subscriber terminal may implement in common a standardized format or language for interchanging subscriber, service, and feature information.

The serving telecommunications exchange may be any device or system which provides network access and call, session, connection, packet, or datagram processing functions to a subscriber terminal. The term "exchange" as used herein is not intended to refer to a specific architecture, and in particular, does not imply the presence of a conventional fabric for switching time-multiplexed PCM voice channels arranged in time slots. Hereinafter, the serving telecommunications exchange will be referred to as a Stored Program Control Center (SPCC).

The home telecommunications agency is a repository for information and services relating to a subscriber's subscription. The agency may include one or more individual agents which are responsible for maintaining information about subscriptions and for providing various subscription-related services to requesters. The agents may generally be implemented as software running on suitable network-connected general-purpose computing facilities, or other network elements, and may be referred to as "software agents". In accord with the present invention, there is described herein an exemplary embodiment thereof in the environment of a telecommunications network. One of skill in the art will appreciate that with minimal modifications the invention may be applied more generally to the field of information processing and related arts. Although the term "telecommunications agency" is used herein, the agency functions could also be fairly characterized as those of an "information processing agency." Thus, the term "telecommunications agency" is also intended to incorporate an "information processing agency."

The term "image" is used herein to refer to the collection of information concerning a particular user or subscription needed by the serving SPCC to process a specific call, and may include subscription, service, feature, and billing information. The "image" for a call may include references to or identification of specific services or features to be made available to the call. In some embodiments, the "image" for a call may also include instructions, call processing steps, billing, authorization limits, or other indicia defining to the serving SPCC certain aspects of such services or features, such as CPE type, implementation, behavior, or performance.

The serving SPCC preferably has coupled thereto an image storage facility for storing temporarily images associated with calls being served by, about to be served by, or having recently been served by, the serving SPCC. The image for a call may be delivered to the serving exchange from the subscriber's home telecommunications agency and/or from the subscriber's Portable Subscriber Module responsive to instructions from the agency. A subscriber desiring to communicate through the telecommunications system must register or identify herself or himself to the serving exchange. The registration may occur upon subscriber request by inserting a PSM into a land-line or wireless subscriber terminal. Alternately, a subscriber may register by manually entering suitable identifying information via a subscriber terminal. The registration could also occur an automatic function of a subscriber terminal (as is now done in wireless systems), based on, for example, information contained in an embedded or removable PSM.

The registration information may directly identify the subscriber's home telecommunications agency, or the serving SPCC may use the registration information to look up the user's home agency in a local or network database. The registration information is transmitted to the user's agency for verification and to allow the agency to determine how to direct the subscriber's incoming calls.

In accord with an aspect of the present invention, the SPCC need not continuously retain, for each authorized or potential subscriber, the subscriber-related information which has been conventionally used to provide service to that subscriber. Such information may include, for example, information needed to authenticate the subscriber, information identifying equipment or resources assigned to the subscriber or the subscriber's line, information for translating directory or routing numbers to line equipment numbers, vendor-proprietary tables indicating services or features to which the subscriber is entitled, and the like. Instead, the SPCC instantiates an image for each subscriber service when the subscriber registers or when service is requested. The image preferably contains all subscriber-related information needed by the SPCC to provide the requested service for the subscriber.

When the subscriber originates a call, the serving SPCC requests an image for that call from the subscriber's home agency. The information comprising the image for the subscriber's call may be transmitted by the home agency itself, or by the PSM in response to instructions from the home agency, or some combination of the two, to the serving SPCC's image store, where the image resides until the call has concluded, after which the image may be erased.

Each serving SPCC need maintain in its image store only images for active, impending, or just-concluded calls. Accordingly, subscriber service images may be considered "transient" in the sense that they are not intended to persist in the serving SPCC in the intervals between subscriber service instances. However, an agency, an agency gateway, or an SPCC may cache subscriber service images where appropriate, provided that cached copies of images which become stale are properly invalidated, as is known in the art. Each SPCC also must provide a minimum set of native or core features for initial operation. Because a new image is provided by the user's agency with each call, service, or registration, problems with stale subscription information in serving SPCCs are minimized, and service, feature, and subscription changes may take effect as soon as the agency records them. Because fewer records need be maintained in the image store (compared to conventional systems which typically maintain some subscription information for a large plurality of users, only a tiny fraction of whom are actively involved in a call at any time), the information in each image may be highly detailed, allowing a serving exchange to identically replicate for each of a large plurality of users the services, features, billing treatment, user interface, and interactions among these elements such users would receive or experience from their home telecommunications network.

In accord with a further aspect of the invention, a subscriber service image may include instructions, call processing steps, or other indicia defining to the serving exchange the implementation, behavior, or performance of one, several, or all services, features, billing treatment, or user interfaces to be available in connection with the call. Moreover, the information comprising the image may be distributed among the subscriber's home agency and the subscriber's PSM, and such information may be transmitted to the SPCC from either or both of the home agency and the PSM. Thus, certain features or services to which a subscriber has subscribed may be provided as a core function of an SPCC, while others may be defined by image information supplied from the home agency and/or PSM. This advantageously eliminates the need to maintain in each SPCC software defining all possible services and features that might be required by all possible subscribers, many of whom may never or only rarely require service at the SPCC. Preferably, feature and service identification, and the instructions, call processing steps, and other indicia needed to define a feature or service, may be provided using a standardized protocol, so that SPCCs and agencies may easily determine whether a service or feature is natively provided by the SPCC or must be supplied as part of the subscriber service image.

In accord with a further aspect of the invention, certain features or services which may be requested from a serving SPCC but which cannot be provided by that SPCC may be provided by another SPCC, such as one in the subscriber's home network. This may occur if a serving SPCC lacks suitable equipment, facilities, or other resources to provide the requested feature or service. For example, a subscriber may request a conference call involving a large number of parties, which call may require special conference bridge circuits for which the serving SPCC is not equipped. In such situations, the subscriber's home agency instructs the serving SPCC to extend the call to another SPCC which is equipped to provide the requested service.

In accord with a further aspect of the invention, the home agency maintains a database of service subscriptions for the subscriber and synchronizes the contents of the subscriber's PSM accordingly. The Home Agency, responsive to service change transactions from a service provider's service order entry, provisioning, and business support systems, transmits PSM update instructions to a subscriber terminal at which the subscriber has registered.

BRIEF DESCRIPTION OF THE DRAWINGS

These and other features of the invention will be best understood by reference to the following detailed description of a preferred embodiment of the invention, taken in conjunction with the accompanying drawings, in which.

DETAILED DESCRIPTION OF THE PREFERRED EMBODIMENTS

Figure 1:
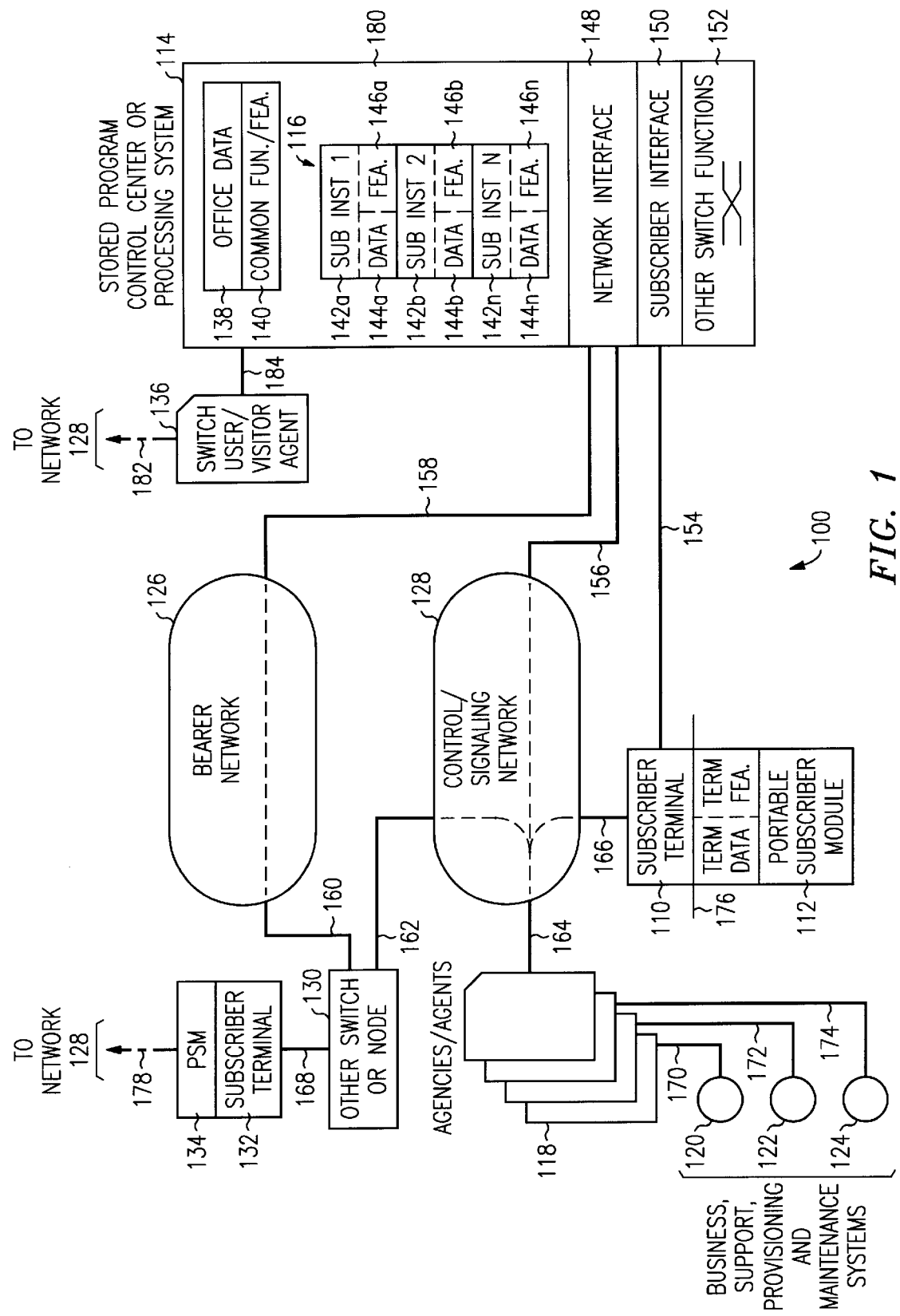
FIG. 1 is a block diagram showing a preferred embodiment 100 of a telecommunications system constructed according to the present invention.

FIG. 1 is a block diagram showing a preferred embodiment 100 of a telecommunications system constructed according to the present invention. The telecommunications system 100 may be constructed in a manner generally similar to known telecommunications systems, but with certain components added, and other components modified, to provide certain call handling and subscriber information handling functions according to an aspect of the present invention. Telecommunications system 100 includes at least one subscriber terminal 110, a serving telecommunications exchange 114, a serving exchange image store 116, and a home telecommunications agency 118, interconnected using suitable network facilities 126, 128, etc., as described further.

The present application relates to telecommunications systems, including multimedia telecommunications systems, which may be implemented using a variety of electronic and optical technologies, including but not limited to: analog electronic systems; digital electronic systems; microprocessors and other processing elements; and software and other embodied collections of steps, instructions, and the like, for implementing methods, processes, or policies in conjunction with such systems and processing elements. The embodiments described herein are exemplary. Thus it will be appreciated that although the embodiments are described in terms of specific technologies, other equivalent technologies could be used to implement systems in keeping with the spirit of the present invention. Moreover, it will be appreciated that in the telecommunications arts, various signal leads, busses, data paths, data structures, channels, buffers, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

A telecommunications system constructed according to an aspect of the present invention may, in various embodiments, provide communications bearing voice signals, data, video, and any other content. Hereinafter, the term "call" is used herein to refer a session of information transfer between a set of subscriber terminals (or other endpoints) via a telecommunications system or network. The term "call" is intended to refer broadly to any type of call, service, connection, session, packet, or datagram, or any related group or stream thereof, regardless of media or content, and regardless of whether or not the communication is circuit, connection, or session oriented. Thus, the term "call" is intended to include, but not be limited to traditional circuit voice calls, packet voice calls, circuit data calls, connectionless calls, or packet data calls, and multimedia variants thereof. The term "call processing" is intended to refer to the functions needed to initiate, maintain, and conclude such calls, including any related features or services.

The subscriber terminal 110 may be a wired telephone, a wireless telephone, a data terminal, or any other device for providing an interface enabling a user to access the telecommunications system. The subscriber terminal preferably has a receptacle, interface, or other facility 176 for operatively coupling to a Portable Subscriber Module (PSM) 112, which uniquely identifies the subscriber to the subscriber terminal 110 and to the Home Telecommunications Agency 118. Optionally, the PSM 112 may also store information relating to services or features to which the subscriber has subscribed, for use by the subscriber terminal 110 or the Serving SPCC 114.

The serving telecommunications exchange 114 may be any device or system which provides network access and call, session, connection, packet, or datagram processing functions to a subscriber terminal such as 110. The term "exchange" as used herein is not intended to refer to a specific architecture, and in particular, does not imply the presence of a conventional fabric for switching time-multiplexed PCM voice channels arranged in time slots. Hereinafter, the serving telecommunications exchange will be referred to as a Stored Program Control Center (SPCC).

The Home Agency 118 is a repository for information and services relating to a subscriber's subscription. The Home Agency 118 may include one or more individual agents which are responsible for maintaining information about subscriptions and for providing various subscription-related services to requestors.

Telecommunications system 100 preferably includes a first network 126 for carrying bearer traffic and a second network 128 for carrying control and signaling traffic. Networks 126 and 128 may be constructed using any appropriate network transmission, switching, and routing technologies, as are known in the art, including but not limited to T-carrier, Optical Carrier (OC), Synchronous Optical Network (SONet), Synchronous Digital Hierarchy (SDH), Internet Protocol (IP), Asynchronous Transfer Mode (ATM) technologies. Although Bearer Network 126 and Control/Signaling Network 128 are shown as separate networks to clarify that the bearer traffic and the control/signaling traffic may take separate paths, these networks may, in fact, be integrated, and bearer and control/signaling traffic may traverse the same network elements. Unless otherwise specified, links between elements of telecommunications system 100 may employ any of the aforementioned technologies.

Serving SPCC 114 communicates with Bearer Network 126 via link 158, and with Control/Signaling Network 128 via link 156. Subscriber terminal 110 communicates with Serving SPCC 114 via link 154, which may be implemented using any link technology appropriate for media types which subscriber terminal 110 and Serving SPCC 114 mutually support. For example, if subscriber terminal 110 is intended to support ordinary voice-grade telephone conversations, link 154 may be an ISDN basic rate interface (BRI) line. If subscriber terminal 110 is intended to support high-speed data or video, link 154 may be an ISDN primary rate interface (PRI) line, an ADSL line, or another appropriate high-speed interconnect. Subscriber terminal 110 communicates with Control/Signaling Network 128 via link 166. Subscriber terminal 110 uses the link 166 to network 128 to communicate with agencies, such as Home Agency 118.

A User/Visitor Agent 136, is preferably connected to Serving SPCC 114 via link 184. Agent 136 is may be connected to Control/Signaling Network 128 via link 182. Agent 136 may have communicate with network 128 via SPCC 114 in lieu of a direct connection to the network. User/Visitor Agent 136 preferably maintains registration and subscription information for subscribers who have registered using subscriber terminals, such as subscriber terminal 110, which are serviced by SPCC 114. Agent 136 may be a component of an agency, and may provide agent services to one or more additional SPCCs.

Telecommunications system 100 preferably also includes other switches and/or network elements 130 which provide service to other subscriber terminals 132. Although only a single other switch 130 is depicted in FIG. 1, a commercial embodiment of a telecommunications system constructed according to the invention would likely include many switches or service-providing network elements 130. Similarly, although only a single other subscriber terminal 132 is shown, a commercial embodiment of a telecommunications system constructed according to the invention would likely include a large number of subscriber terminals 132. Each of subscriber terminals 132 preferably includes a receptacle for coupling a Portable Subscriber Module 134. Subscriber terminal 132 is connected to SPCC 130 via a link 168. Subscriber terminal 132 is connected to Control/Signaling Network 128 via link 178. SPCC 130 is connected to Bearer Network 126 via link 160 and to Control/Signaling Network 128 via link 162.

The SPCC 114 may be implemented using, for example, any suitable stored-program-controlled telephone switching system or mobile switching center, with modifications to maintain and use subscriber service images as further described herein. In a commercial embodiment, the SPCC 114 may be implemented using a distributed control digital switch, such as the 5ESS® switching system, a product of Lucent Technologies Inc., 600 Mountain Avenue, Murray Hill, N.J., 07974-0636, and described in the AT&T Technical Journal, vol.64, number 6, July/August 1985, pages 1303–1564. SPCC 114 may also be implemented using a distributed control, integrated services digital network (ISDN) electronic telephone switching system such as the system disclosed in U.S. Pat. No. 4,592,048, issued to M. W. Beckner, et al., on May 27, 1986. Alternately, SPCC 114 may be implemented using a distributed multi-service switching and call processing platform commercially available from Lucent Technologies Inc., under the designation 7R/E. The SPCC 114 could also be implemented as a router or packet switch.

As best seen in FIG. 1, Serving SPCC 114 may comprise several functional elements, including a control element 180, a network interface element 148, a subscriber interface element 150, and one or more elements 152 for providing other functions of an SPCC, such as circuit switching, packet switching, routing, signal processing, and the like. The control element 180 may be implemented using a general-purpose computer, an embedded processor, or other processor means as is known in the art. The control element 180 preferably includes code or instruction storage facilities 140 for certain functions, features, and services which are part of the native functionality of Serving SPCC 114. These functions may include basic functions of the Serving SPCC 114 that would likely be needed in a significant fraction of service requests, or functions related to maintenance, administration, or other requirements of the Serving SPCC 114 unlikely to vary on a per-subscriber basis. The control element 180 preferably also includes storage facilities 138 for "office data", including storage needed for the routine functions of the control element and that needed to define the operation of the SPCC 114, but generally excluding per-subscriber data.

Although the present application describes a preferred embodiment of the invention in which certain functions of Serving SPCC 114 are performed by a telecommunications switching system, it will be appreciated that equivalent functions could be provided by other network elements, including elements now known and those which may be developed in the future to meet the evolving needs of telecommunications customers and service providers. For example, the some or all functions of SPCC 114 could be provided by various nodes of an Intelligent Network, as described in AT&T Technical Journal, Summer, 1991, pp. 11–25, some of which nodes may not have significant switching or routing capabilities. Some or all functions of SPCC 114 could also be provided by a server computer or a telecommunications gateway component.

The Home Agency 118 is a repository for information and services relating to a subscriber's subscription. The Home Agency 118 is connected to Control/Signaling Network 128 via link 128. The Home Agency 118 may include one or more individual agents which are responsible for maintaining information about subscriptions and for providing various subscription-related services to requestors (see FIG. 2). Service requestors may include: billing, service order entry, provisioning, maintenance, and other business systems of a subscriber's service provider, such as external systems 120, 122, 124, connected to Home Agency 118 via links 170, 172, 174. Service requesters may also include other agents or agencies and SPCCs or other network elements which may directly provide a telecommunications service to a subscriber.

Figure 2:
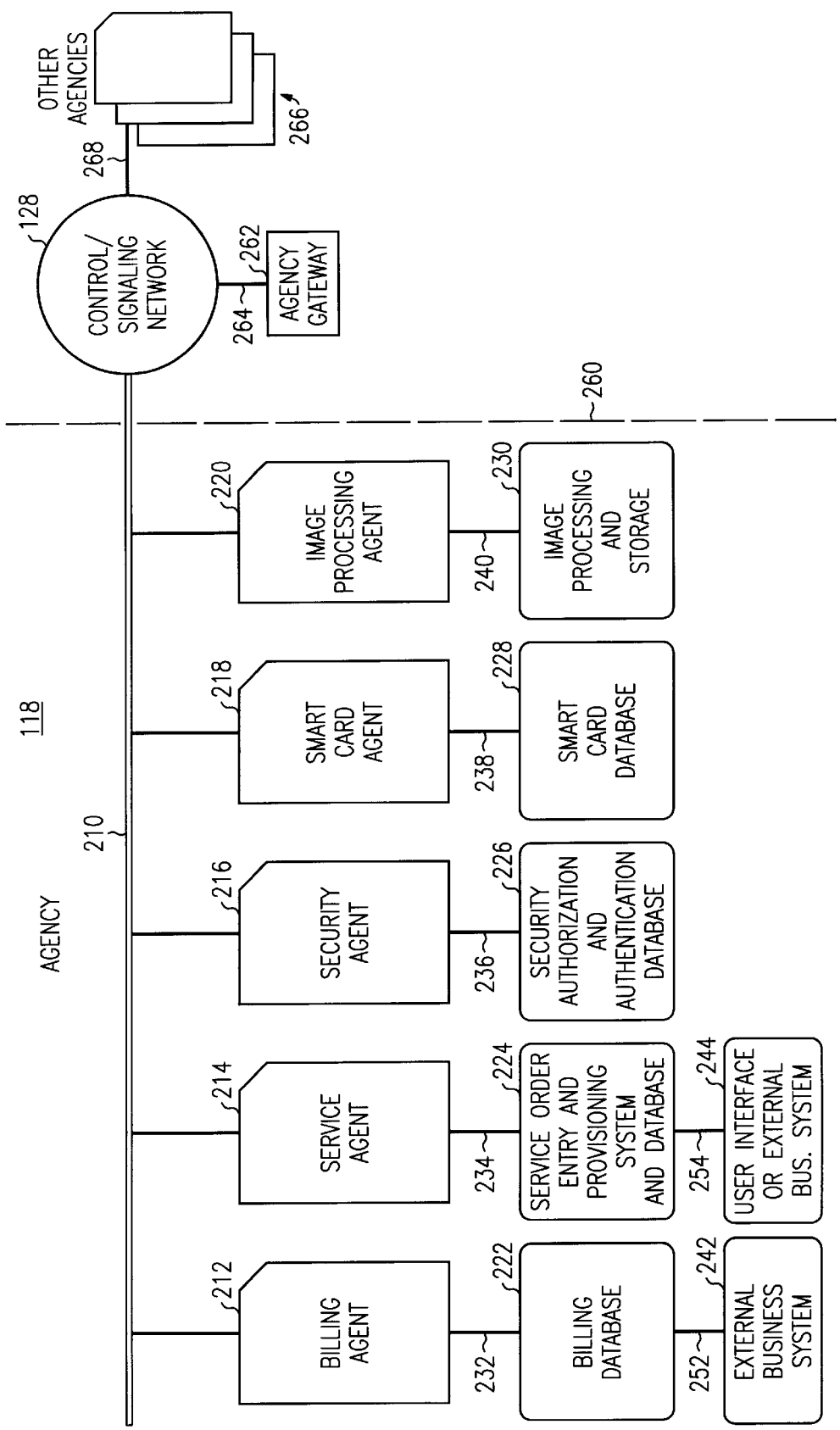
FIG. 2 is a block diagram showing an exemplary telecommunications agency 118 constructed according to the present invention for use with the telecommunications system 100 of FIG. 1, including several individual agent elements.

FIG. 2 is a block diagram showing an exemplary Home Telecommunications Agency 118 constructed according to the present invention for use with the telecommunications system 100 of FIG. 1. As best seen in FIG. 2, the various functions of Home Agency 118 may be distributed over several individual agent elements which are interconnected by a local network 210, which may, but need not be a local-area network. The network 210 is connected to Control/Signaling Network 128. The particular distribution of functions to agent elements may vary according to the needs of particular telecommunications networks and service providers, but, for example, agency 118 may include the following elements: a billing agent 212, responsible for acquiring and/or processing message accounting records and other similar information needed for billing; a service agent 214, responsible for maintaining records of services and features to which a subscriber has subscribed; a security agent 216, responsible for authenticating the subscriber and authorizing network elements to provide services therefor; a smart card agent 218, responsible for maintaining and updating the contents of the PSM; and an image processing agent 220, responsible for delivering to SPCCs and/or other network elements information needed to provide a service to the subscriber, including service images (described further below). Agency 118 could also include a mobility agent (not shown), responsible for tracking the subscriber's location with respect to home or other telecommunications networks so that calls and other services may be delivered. The functions of the mobility agent could also be performed by one more of the other agents.

The billing agent 212 preferably manages a billing database 222 to which it is connected via a link 232. The billing database 222 may be coupled to an external business system 242 of a service provider via a link 252. The service agent 214 is preferably connected to a service order entry and provisioning system and database 224 via a link 234. The service order entry and provisioning system and database may be coupled to a user interface or external business system 244 of a service provider via a link 254. The security agent 216 preferably manages a security, authorization, and authentication database 226, to which it is connected via a link 236. The smart card agent 218 preferably manages a smart card database 228, to which it is connected via a link 238. The image processing agent 220 is preferably connected to an image processing and storage system 230 via a link 240.

Each of agents 212, 214, 216, 218, 220, and 136 (FIG. 1) is preferably a self-contained information processing element (which may include software and/or hardware components) having responsibility for a particular, limited set of functions and data, and providing a particular, limited set of external interfaces, thereby limiting system complexity and promoting robustness, scalability, and optimum distribution of necessary functions to computing and other network elements. Although agents are characterized as self-contained, it will be appreciated that multiple agents may be implemented on a single computing and/or network element, a single agent may be distributed over several elements, and agents may cooperate with other agents to accomplish necessary functions. Agents may be implemented using any appropriate software and hardware technologies. By way of example, but not limitation, agents may be implemented as described in U.S. Pat. No. 5,970,122, entitled "Two-Way Wireless Messaging System Having User Agent", which issued to LaPorta et al. on Oct. 19, 1999, and in U.S. Pat. No. 6,086,086, entitled "Network-Based Migrating User Agent for Personal Communication Services", which issued to LaPorta et al. on Jul. 4, 2000, which patents are incorporated herein by reference. Also by way of example, but not limitation, agents may also be arranged as described in the publication George Y. Liu and Gerald Q. Maguire Jr., "Efficient Mobility Management Support for Wireless Data Services", Proceedings of the 1995 IEEE 45th Vehicular Technology Conference, Jul. 25–28, 1995, pp. 902–906; and in the publication Seth Grimes, "Agents Come In From the Cold", Database Programming and Design (Miller Freeman Inc.), April 1998, pp. 48–53.

Agency 118 and its components communicate with other agencies, such as 266, network 210 and Control/Signaling Network 128. Other agencies, e.g. 266, are connected to Control/Signaling Network 128 via link 268. Although only one other agency 266 and one interconnecting link 268 are shown, in a commercial embodiment of a telecommunications network there may be many agencies and links. Agencies may be organized consistent with the organization of service providers or networks, but they need not be. Similarly, agencies may be operated by the same service providers who operate telecommunications networks, but they may also be operated by third parties. Optionally, an agency gateway 262 may be connected to Control/Signaling Network 128 via link 264. Agency gateway 262 facilitates communications among agencies. For example, agency gateway 262 may provide message switching and clearinghouse functions between agencies. This may advantageously reduce the amount of knowledge agencies need have regarding other agencies. If the agency gateway 262 is provided, an agency wishing to communicate with another agency may use the agency gateway 262 as an intermediary. In some cases, the agency gateway may provide routing for messages to agencies based on, for example, subscriber information, relieving a sending agency of the responsibility to determine the address of or route to a home agency of a subscriber. The agency gateway 262 may also provide any other functions needed to facilitate or mediate communications among agencies.

The term "image" is used herein to refer to the collection of information concerning a particular user or subscription needed by the Serving SPCC 114 to process a specific call, and may include subscription, service, feature, and billing information. The "image" for a call may include references to or identification of specific services or features to be made available to the call. In some embodiments, the "image" for a call may also include instructions, call processing steps, interactions among various features and services, or other indicia defining to the Serving SPCC 114 the implementation, behavior, or performance of such services or features.

As best seen in FIG. 1, the Serving SPCC 114 preferably has coupled thereto an image storage facility 116 for storing temporarily images associated with calls being served by, about to be served by, or having recently been served by, the Serving SPCC 114. The image storage facility 116 preferably has a number of locations 142a, 142b, . . . 142n, for storing subscriber service image instances. Each image instance contains the information needed to service a call for the subscriber involved, and incorporates information regarding the services to which the subscriber may be eligible, and information, defining to the Serving SPCC 114 how such services should be delivered. Each image instance preferably includes a subscriber data element (e.g., 144a, 144b, . . . 144n), and a service/feature data element (e.g., 146a, 146b, . . . 146n). The service/feature data element may describe standardized features or services to be delivered to the subscriber, where such features and services are available as native capabilities of Serving SPCC 114. In that case, the service/feature data element is preferably supplied in a standardized format and/or language, such that each service/feature data element or component thereof uniquely and unambiguously identifies the particular standardized feature or service to be provided. The service/feature data element may also describe instructions or call processing steps to be used by Serving SPCC 114 to deliver other features or services which are not among the native capabilities of Serving SPCC 114. Although three image instances are shown in FIG. 1, in a commercial embodiment constructed in accord with an aspect of the invention, a sufficient number of instances would be provided to accommodate a desired number of simultaneous pending, active, and just-concluded calls or equivalent services.

The image for a call may be delivered to the Serving SPCC 114 from the subscriber's home telecommunications agency 118 and/or from the subscriber's Portable Subscriber Module 112 responsive to instructions from the agency. A subscriber desiring to communicate through the telecommunications system 100 must register or identify herself or himself to the Serving SPCC 114. The registration may occur upon subscriber request by inserting a PSM 112 into a land-line or wireless subscriber terminal, such as PSM 112. Alternately, a subscriber may register by manually entering suitable identifying information via a subscriber terminal. The registration could also occur an automatic function of a subscriber terminal (as is now done in wireless systems), based on, for example, information contained in an embedded or removable PSM.

The registration information is transmitted to the user's Home Agency 118 for verification and to allow the agency to determine how to direct the subscriber's incoming calls. The registration information may directly identify the subscriber's Home Agency 118, or the Serving SPCC 114 may use the registration information to look up the user's home agency in a local or network database, which may reside in agency gateway 266 (FIG. 2). Alternately, Serving SPCC 114 may transmit registration messages through agency gateway 266 destined for the subscriber's Home Agency 118 without being aware of the ultimate destination of the messages.

When the subscriber originates a call, the serving SPCC 114 requests an image for that call from the subscriber's Home Agency 118. The information comprising the image for the subscriber's call may be transmitted by the home agency itself, or by the PSM 112 in response to instructions from the home agency, or some combination of the two, to the serving SPCC's image store 116, where the image resides until the call has concluded, after which the image may be erased. The serving SPCC 114 uses the image to process the call.

When a call to the first subscriber is originated by a second user at a second SPCC, such as SPCC 130, the second SPCC determines which home agency or agency gateway serves the first subscriber and requests from the home agency instructions on how to route a call to the subscriber. The first subscriber's Home Agency 118 provides instructions enabling the second serving SPCC to route the call to the first subscriber via the first serving SPCC 114. The first subscriber's Home Agency 118 also causes to be transmitted a call or service image to the first serving SPCC's image store 116, enabling the first serving SPCC 114 to appropriately process the incoming call.

Each serving SPCC 114 need maintain in its image store 116 only images for active, impending, or just-concluded calls. Accordingly, subscriber service images may be considered "transient" in the sense that they are not intended to persist in the serving SPCC in the intervals between subscriber service instances. Because a new image is provided by the subscriber's Home Agency 118 with each call, problems with stale subscription information in serving SPCCs are minimized, and service, feature, and subscription changes may take effect as soon as the agency records them. However, an agency, an agency gateway, or an SPCC may cache subscriber service images where appropriate, provided that cached copies of images which become stale are properly invalidated, as is known in the art. Because fewer records need be maintained in the image store (compared to conventional systems which typically maintain some subscription information for a large plurality of users, only a tiny fraction of whom are actively involved in a call at any time), the information in each image may be highly detailed, allowing a serving exchange to identically replicate for each of a large plurality of subscribers the services, features, billing treatment, user interface, and interactions among these elements such subscribers would receive or experience from their home telecommunications network. The terms service, feature, billing treatment, user interface, and interactions, are enumerated herein by way of example, but not limitation, as elements experienced by a subscriber when interacting with the serving exchange and the subscriber terminal, any or all of which elements may be a function of the subscriber service image. Unless otherwise specified, the terms service or feature appearing alone are intended to incorporate the other elements mentioned above and should be so interpreted.

As noted above, the image may describe the services, features, billing treatment, user interface, and interactions among these elements, to be applied to a call by referring to predefined, and preferably standardized, identifiers of such services, features, billing treatment, user interfaces and interactions. For example, the information in the image is preferably supplied in a standardized format and/or language, such that the image, or components thereof, uniquely and unambiguously identify the particular standardized features or services to be provided. However, even well-known services and features may have been implemented historically in different ways by different equipment vendors. Service providers have arranged for development of customized services and features. Different regulatory and standards agencies have inconsistently specified the behavior of services and features. Thus, the number of permutations of aspects of even one service or feature may be so large as to prohibit the a priori deployment of all permutations of the service or feature on a single serving SPCC for invocation in a call image.

In accord with a further aspect of the invention, a subscriber service image may include instructions, call processing steps, or other indicia defining to the serving exchange the implementation, behavior, or performance of one, several, or all services, features, billing treatment, user interfaces, and interactions among these elements, to be available in connection with a call. Moreover, the information comprising the image may be distributed among the subscriber's home agency and the subscriber's PSM, and such information may be transmitted to the SPCC from either or both of the home agency and the PSM. Thus, certain features or services to which a subscriber has subscribed may be provided as a core function of an SPCC, while others may be defined by image information supplied from the home agency and/or PSM. Moreover, a portion of the subscriber service image may be downloaded to the subscriber terminal 110 to define features, services, or aspects of the user interface to be provided by the subscriber terminal 110. The term "customizable behavior" refers to any changeable aspects of the subscriber terminal, including those mentioned above, which may be controlled by downloading to the subscriber terminal a subscriber service image or part thereof from an agency or a PSM.

Figure 3:
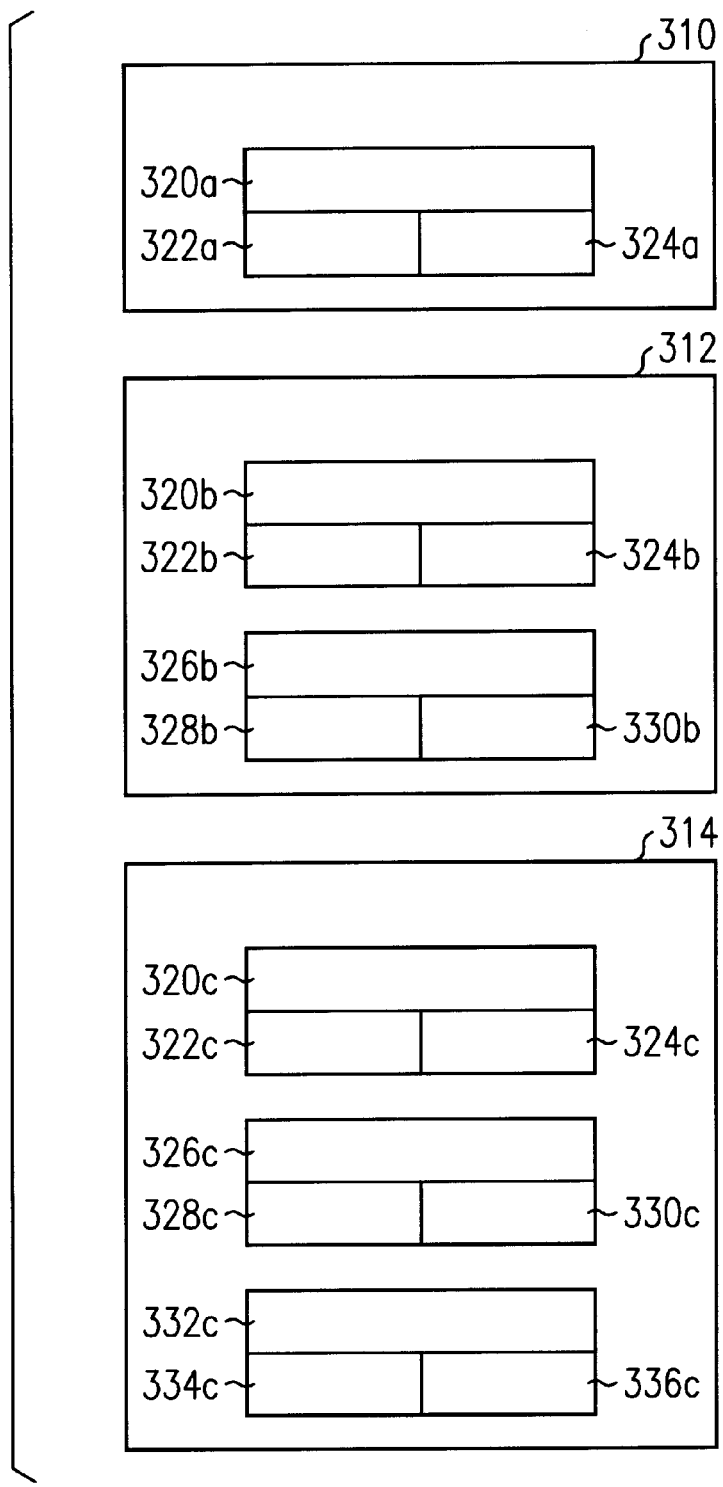
FIG. 3 is a block diagram depicting three exemplary Portable Subscriber Modules (PSMs) 310, 312, 314 for use in conjunction with the telecommunications system 100 of FIG. 1.

FIG. 3 is a block diagram depicting three exemplary Portable Subscriber Modules (PSMs) 310, 312, 314 for use in conjunction with the telecommunications system 100 of FIG. 1. PSM 310 is a first type of PSM that contains information 320a useful in identifying and authenticating the subscriber. The information may contain data 322*a* and instructions 324*a* needed to perform authentication and related functions.

PSM 312 is a second type of PSM that contains information 320*b* useful in identifying and authenticating the subscriber, and information 326*b* defining features, services, or aspects of the user interface to be provided by the subscriber terminal. Information 320*b* is similar to the information 320*a* described above. Information 326*b* may contain data 328*a* and instructions 330*b* needed by the subscriber terminal to provide the features, services, and user interface functions.

PSM 314 is a third type of PSM that contains information 320*c* useful in identifying and authenticating the subscriber, information 326*b* defining features, services, or aspects of the user interface to be provided by the subscriber terminal, and information 332*c* defining features, services, or aspects of the user interface to be provided by the Serving SPCC 114. Information 320*c* and 326*c* are similar to the information 320*b* and 326*b*, respectively, discussed above. Information 332*c* may contain data 334*c* and instructions 336*c* needed by the Serving SPCC 114 to provide the features, services, and user interface functions.

Increasing the information stored in the PSM may help reduce network resource demands by reducing the amount of information which must be loaded to the subscriber terminal 110 and the Serving SPCC 114 each time the subscriber places or receives a call.

PSMs 310, 312, and 314 may be implemented as a "smart card" device containing a secure microprocessor, program storage, and data storage, as is known in the art. For example, PSMs 310, 312, and 314 may be implemented using the smart card described in U.S. Pat. No. 5,821,983, which issued to M. J. Weiss on Oct. 13, 1998, and is assigned to Lucent Technologies Inc. Other smart card devices, and other identification devices, could also be used.

Loading to the Serving SPCC 114 image information defining services, features, billing treatment, or user interfaces advantageously eliminates the need to maintain in each SPCC software defining all possible services and features that might be required by all possible subscribers, many of whom may never or only rarely require service at the SPCC. Preferably, feature and service identification, and the instructions, call processing steps, and other indicia needed to define a feature or service, may be provided using a standardized protocol, so that SPCCs and agencies may easily determine whether a service or feature is natively provided by the SPCC or must be supplied as part of the subscriber service image.

Figure 4:
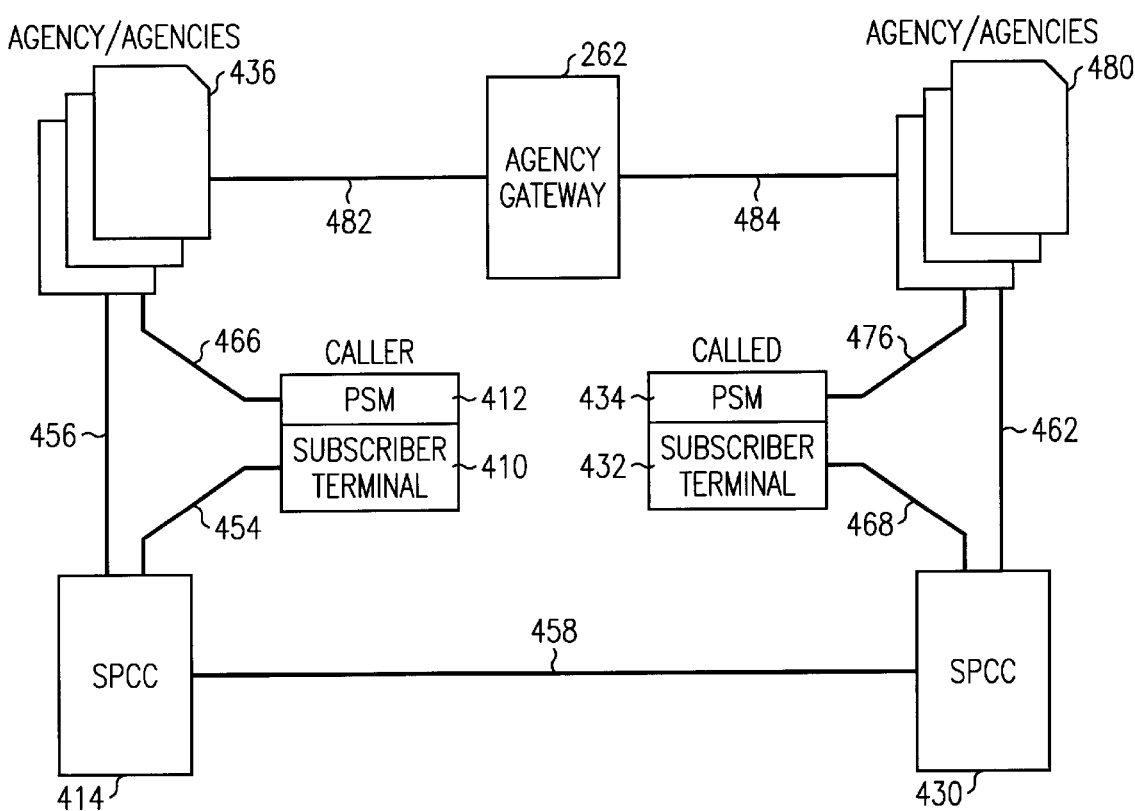
FIG. 4 is a block diagram depicting information flow in an embodiment of a telecommunications system constructed according to the present invention in which a call is handled between a first SPCC and a second SPCC.
Figure 7A:
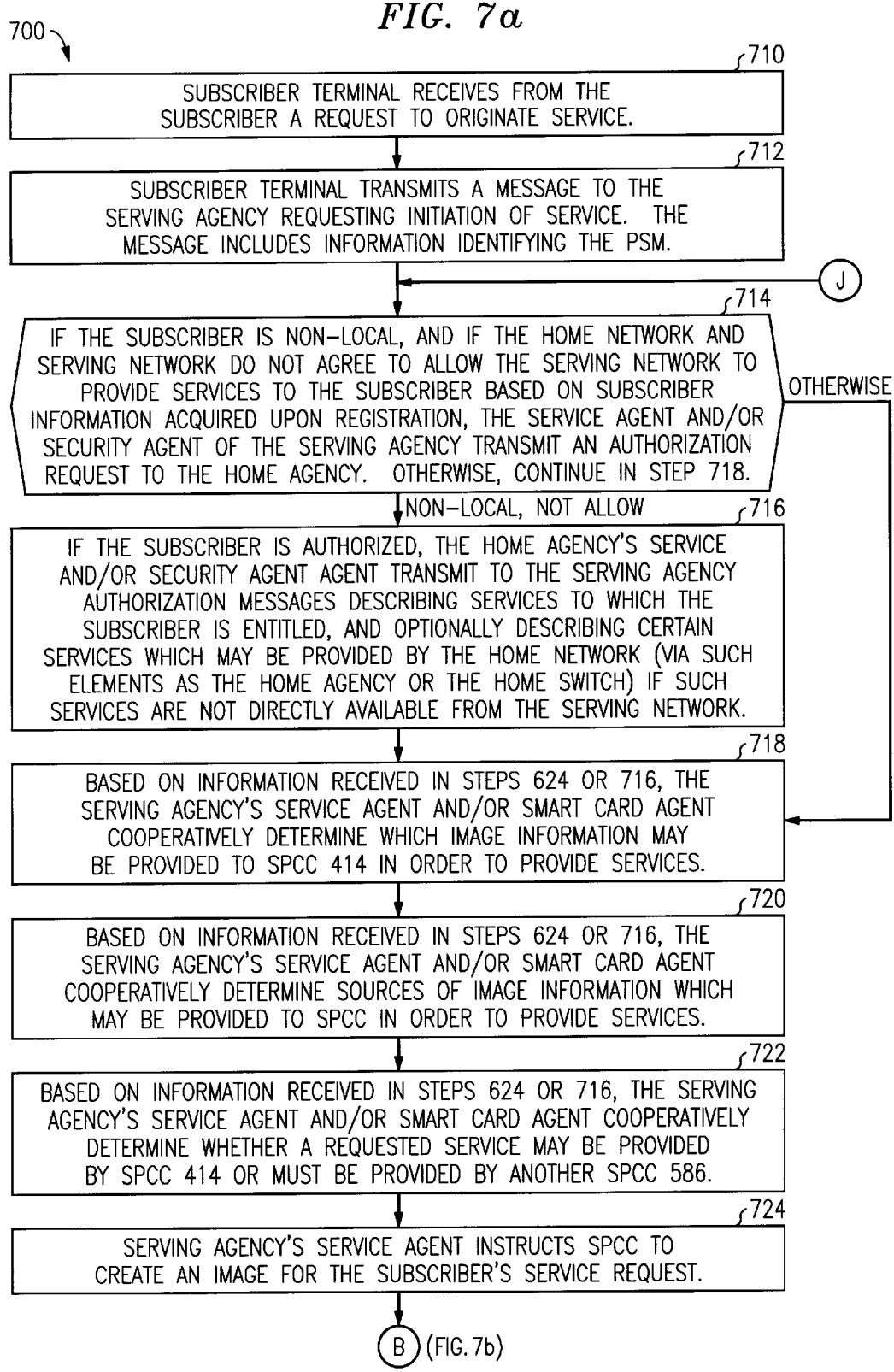
FIG. 7 is a flow diagram showing an exemplary method 700 for use in conjunction with the telecommunications system of FIG. 1 for setting up a call origination on behalf of a subscriber.
Figure 7B:
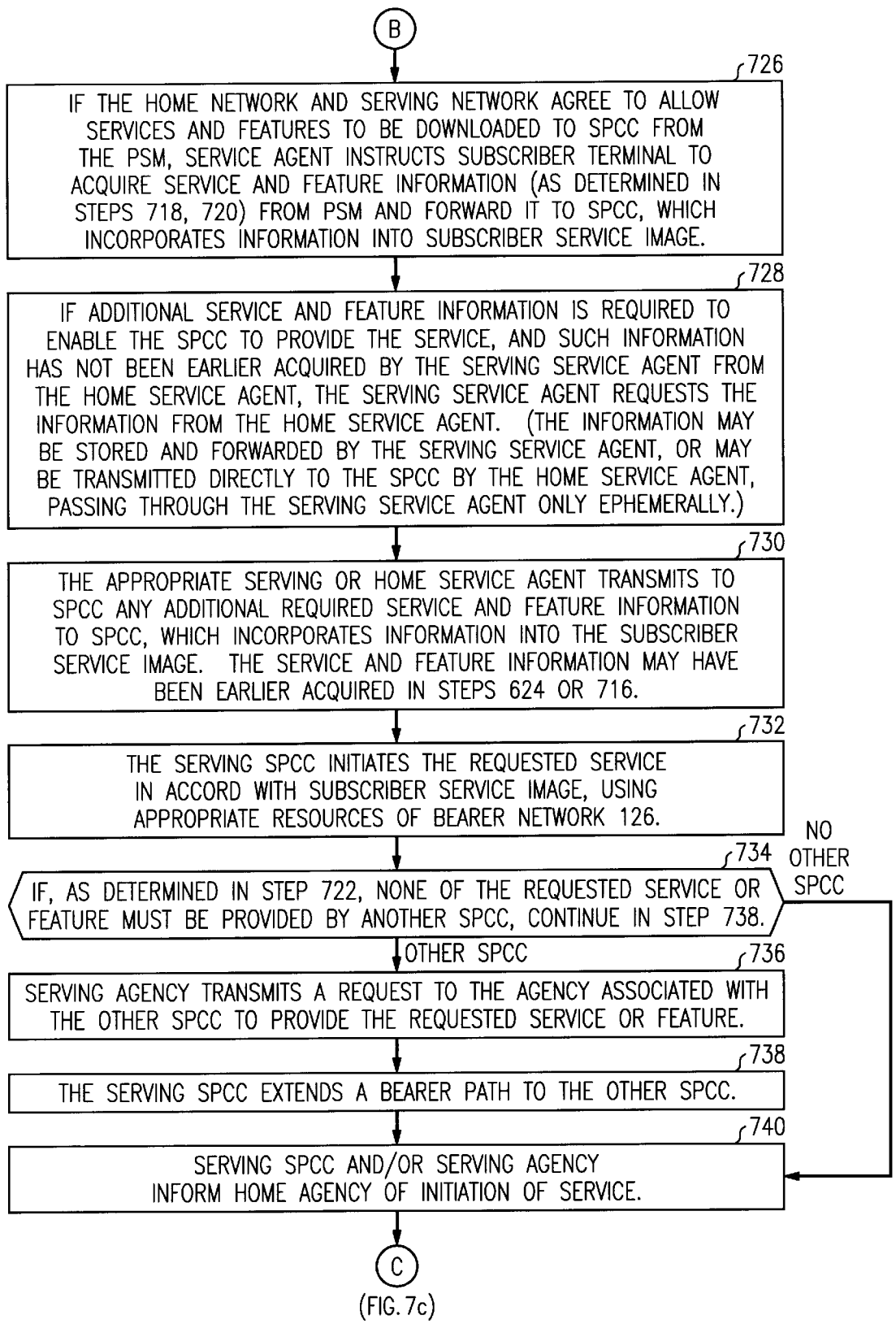
Figure 7C:
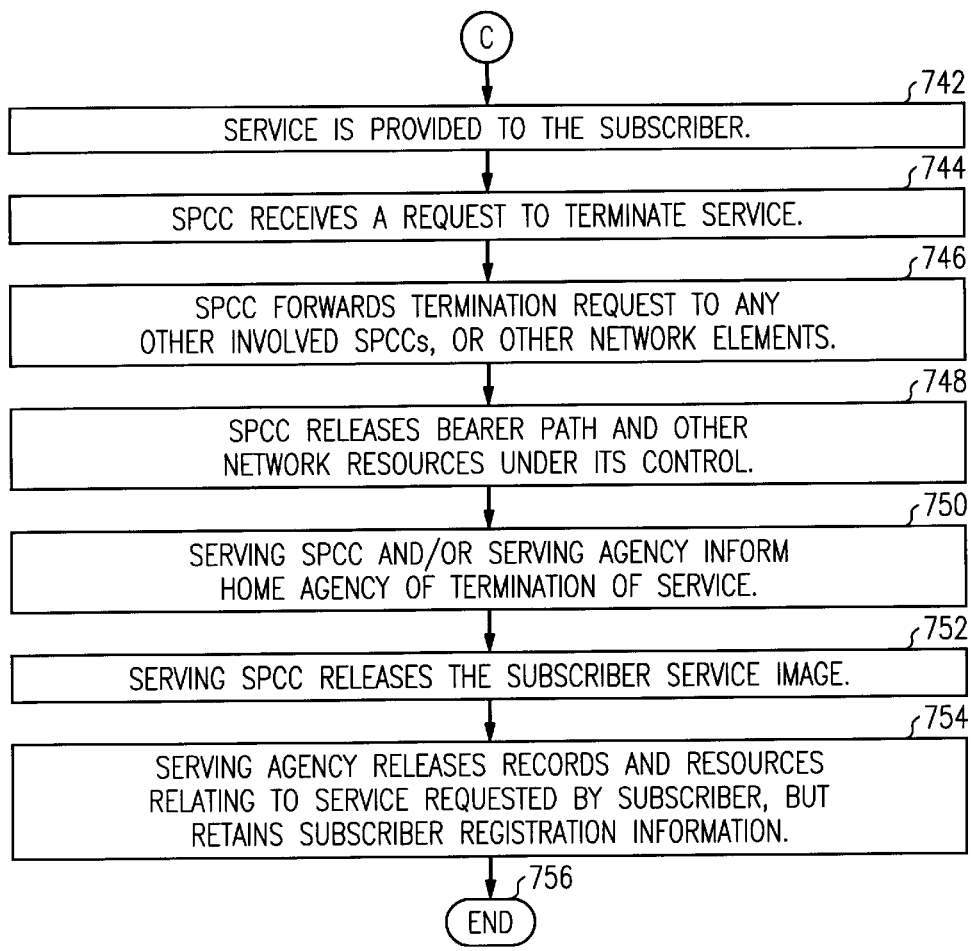
Figure 8:
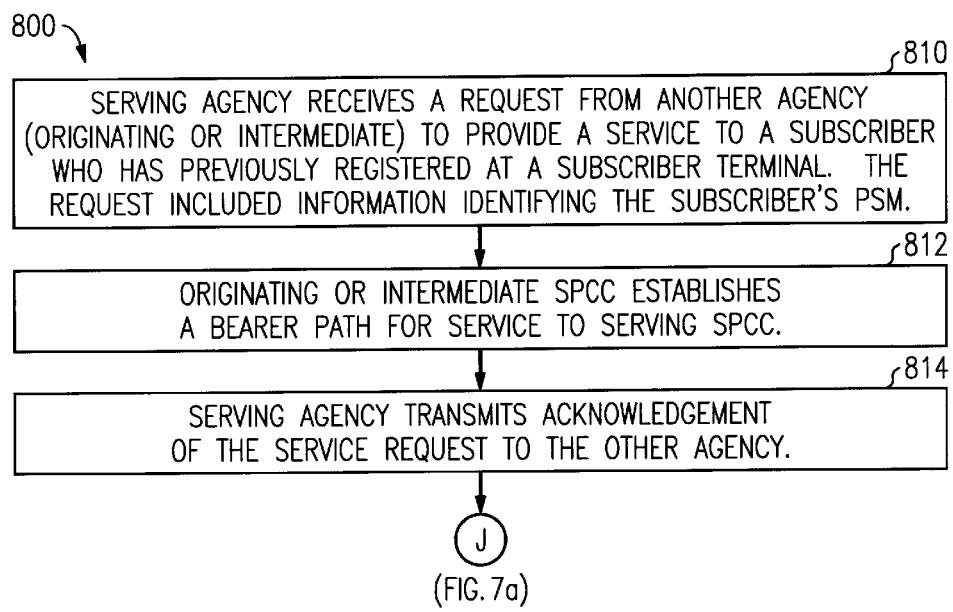
FIG. 8 is a flow diagram showing an exemplary method 800 for use in conjunction with the telecommunications system of FIG. 1 for setting up an incoming call termination on behalf of a subscriber.

FIG. 4 is a block diagram depicting information flow in an embodiment of a telecommunications system constructed according to the present invention in which a call is handled between a first SPCC 414 and a second SPCC 430. A calling subscriber terminal 410 has a subscriber's PSM 412. The subscriber terminal 410 is connected to home agency 436 via a control/data path 466 and to serving SPCC 414 via a bearer path 454. If the subscriber is being served by a network other than the subscriber's home network, the paths to the home agency may extend through a local serving agency (not shown in FIG. 4, but a part of which is represented by switch user/visitor agent 136 of FIG. 1) or an agency gateway. The serving SPCC 414 is connected to the subscriber's home agency via a control/data path 456. The home agency 436 is connected to an agency gateway 262 via a link 482. On the called side, a called subscriber terminal 432 has a subscriber's PSM 434. The called subscriber terminal 432 is connected to called subscriber's home agency 480 via a control/data path 476 and to called party serving SPCC 430 via a bearer path 468. The called party serving SPCC 430 is connected to the called subscriber's home agency 480 via a control/data path 462. The called party home agency 480 is connected to an agency gateway 262 via a link 484. A bearer path 458 links calling SPCC 414 and called SPCC 430. Methods for registering, originating, and receiving calls, using the arrangement of FIG. 4 are shown in FIGS. 6–8, and discussed below.

In accord with a further aspect of the invention, certain features or services which may be requested from a serving SPCC but which cannot be provided by that SPCC may be provided by another SPCC, such as one in the subscriber's home network. This may occur if a serving SPCC lacks suitable equipment, facilities, or other resources to provide the requested feature or service. For example, a subscriber may request a conference call involving a large number of parties, which call may require special conference bridge circuits for which the serving SPCC is not equipped. In such situations, the subscriber's home agency instructs the serving SPCC to extend the call to another SPCC which is equipped to provide the requested service.

Figure 5:
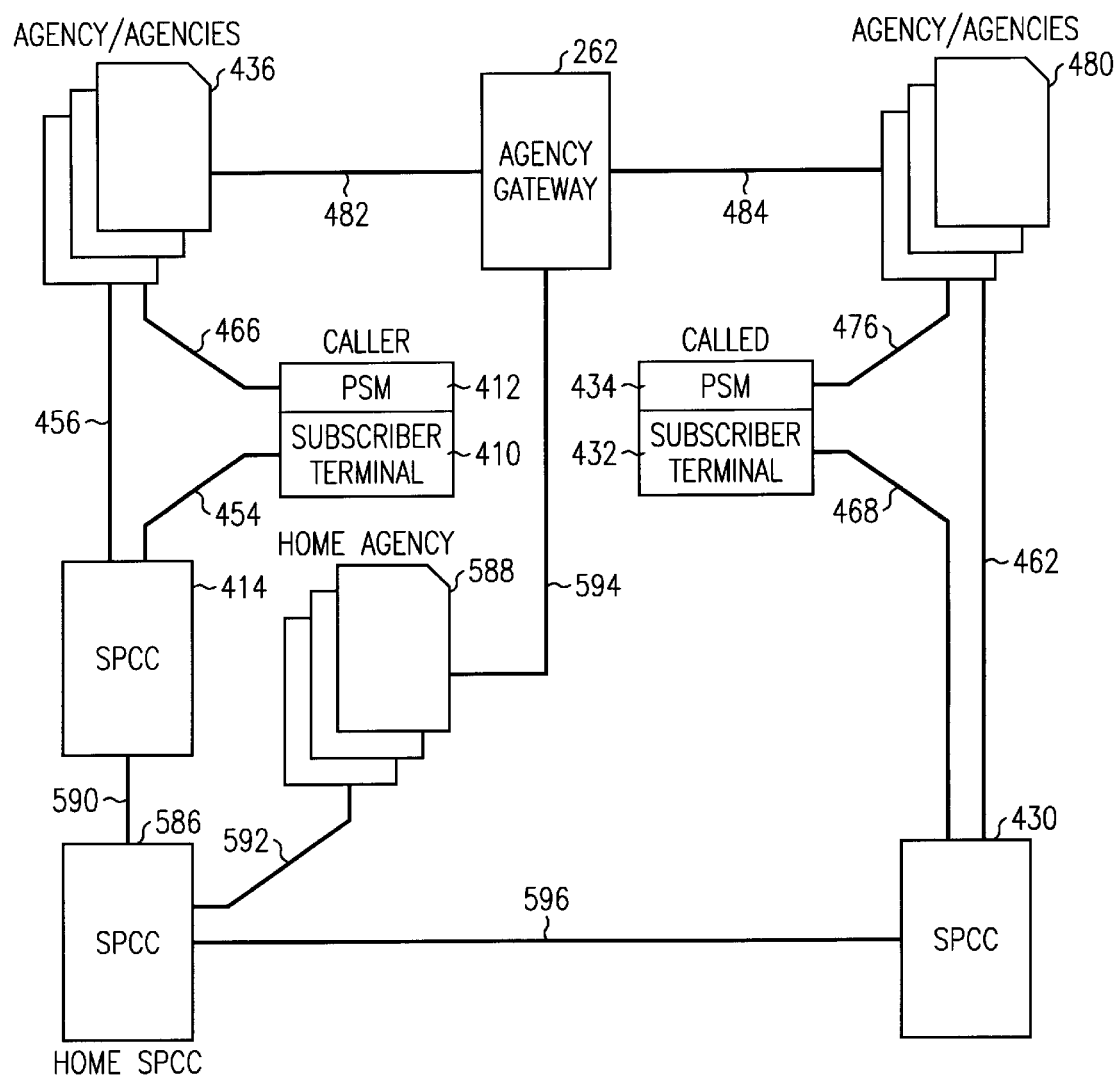
FIG. 5 is a block diagram depicting information flow in an embodiment of a telecommunications system constructed according to the present invention in which a call between a first SPCC and a second SPCC requires a service provided by a third SPCC.

FIG. 5 is a block diagram depicting information flow in an embodiment of a telecommunications system constructed according to the present invention in which a call between a first SPCC 414 and a second SPCC 430 requires a service provided by a third SPCC 586. Unless otherwise specified, the elements of FIG. 5 are identical to those of FIG. 4, and the discussion of FIG. 4 apply equally to those elements. In FIG. 5, it is assumed that calling party serving SPCC 414 is unable to provide a desired service. For example, if the calling party is a subscriber of another network, the subscriber may have subscribed to services that are typically available in their home network, but not in the visited network. Accordingly, instead of providing bearer path 458 directly from SPCC 414 to called party serving SPCC 430, a bearer path 590 extends from SPCC 414 to an intermediate SPCC 586. A second bearer path 596 extends from the intermediate SPCC 586 to SPCC 430. A control/data path 592 extends from intermediate SPCC 586 to the subscriber's home agency 588. A second control/data path 594 extends from the home agency 588 to the agency gateway 262. The intermediate SPCC 586 may, but need not be, a part of the subscriber's home network. Any SPCC capable of providing the desired service could be used as the intermediate SPCC 586.

Figure 6A:
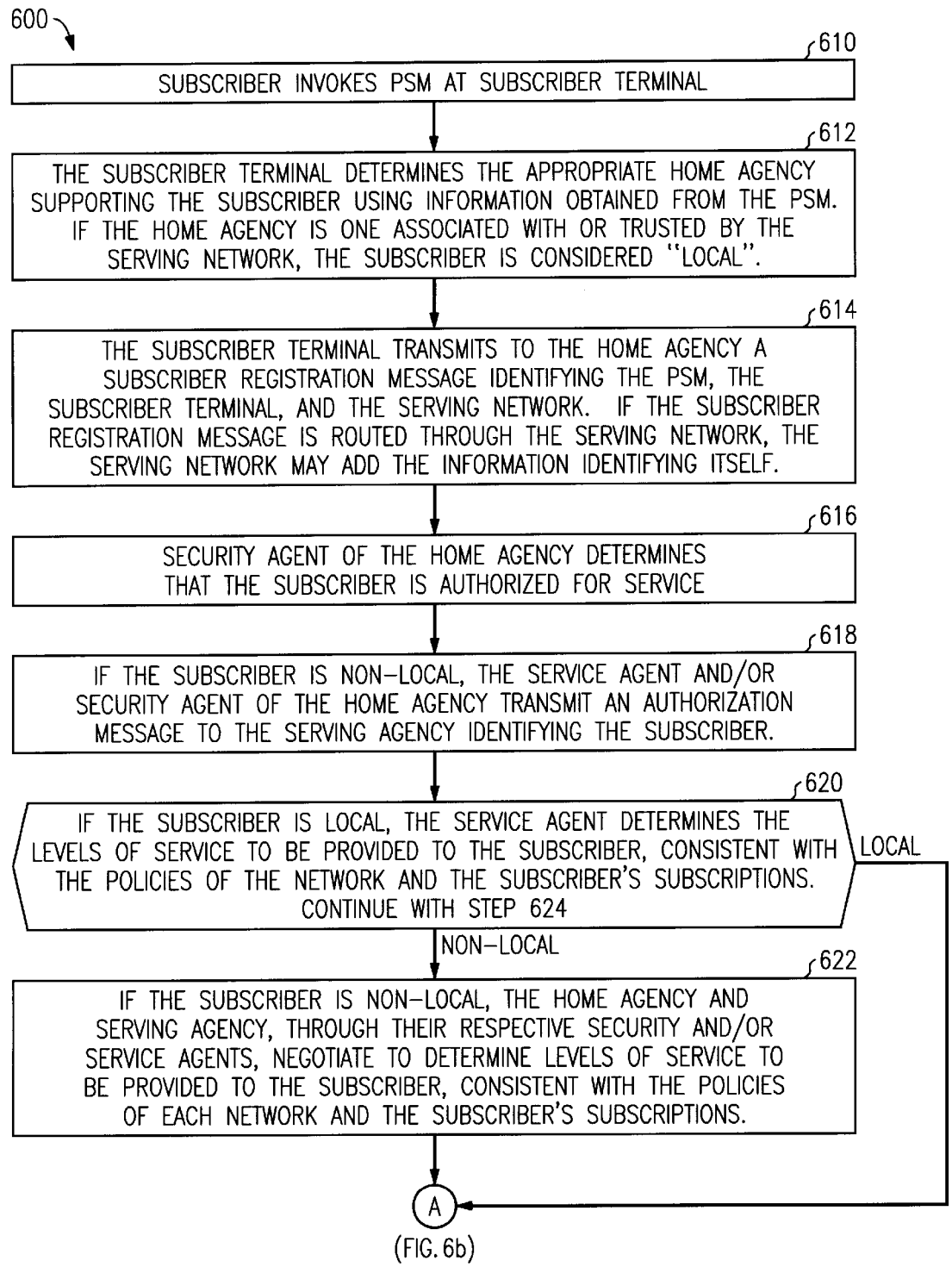
FIG. 6 is a flow diagram showing an exemplary method 600 for use in conjunction with the telecommunications system of FIG. 1 for registration of a subscriber at a subscriber terminal.
Figure 6B:
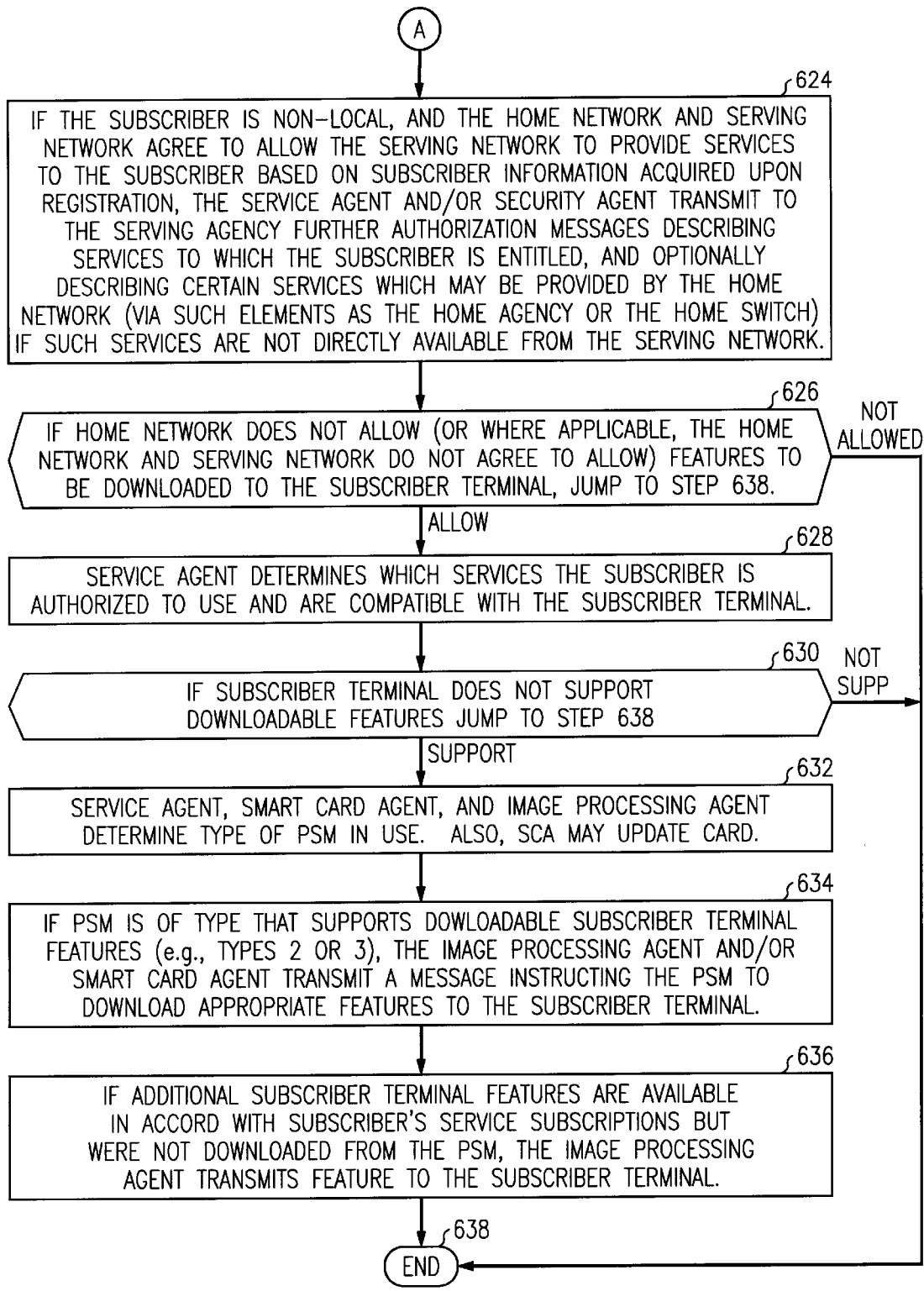

FIG. 6 is a flow diagram showing an exemplary method 600 for use in conjunction with the telecommunications system of FIG. 1 for registration of a subscriber at a subscriber terminal. The method begins in step 610 in which the subscriber activates the subscriber's PSM 412 or 434 at a Subscriber Terminal 410, 434, respectively. In step 612, the Subscriber Terminal determines the appropriate Home Agency 436, 480 supporting the subscriber using information obtained from the PSM. If the Home Agency is one associated with or trusted by the Serving Network, the subscriber is considered "local".

In step 614, the Subscriber Terminal transmits to the Home Agency a subscriber registration message identifying the PSM, the Subscriber Terminal, and the network or SPCC serving the subscriber. If the subscriber registration message is routed through the Serving Network or SPCC, the Serving Network may add the information identifying itself. Any messages, including but not limited to the one described here with respect to step 614, which rely on information from the PSM, may also be transmitted at the instance and under the control of the PSM. In that case, the Subscriber Terminal may simply act as a message conduit.

In step 616, the Security Agent 216 (FIG. 2) of the Home Agency determines that the subscriber is authorized for service. In step 618, if the subscriber is non-local, the Service Agent 214 (FIG. 2) and/or Security Agent 216 (FIG. 2) of the Home Agency transmit an authorization message to the Serving Agency identifying the subscriber. In step 620, if the subscriber is local, the Service Agent determines determine levels of service to be provided to the subscriber, consistent with the policies of the network and the subscriber's subscriptions. The method then continues with step 624.

If the subscriber is non-local, the method continues with step 622, in which the Home Agency and Serving Agency, through their respective Security and/or Service Agents, negotiate to determine levels of service to be provided to the subscriber, consistent with the policies of each network and the subscriber's subscriptions.

In step 624, if the subscriber is non-local, and the Home Network and Serving Network agree to allow the Serving Network to provide services to the subscriber based on subscriber information acquired upon registration, the Service Agent 214 and/or Security Agent 216 transmit to the Serving Agency further authorization messages describing services to which the subscriber is entitled, and optionally describing certain services which may be provided by the home network (via such elements as the home agency or the home switch) if such services are not directly available from the serving network.

In step 626, if the Home Network does not allow (or where applicable, the Home network and Serving Network do not agree to allow) features to be downloaded to the Subscriber terminal, the method continues with step 638. Otherwise, in step 628, the Service Agent determines which services the subscriber is authorized to use and are compatible with the subscriber terminal.

In step 630, if the Subscriber Terminal does not support downloadable features, the method continues in step 638. Otherwise, in step 632, the Service Agent, Smart Card Agent, and Image Processing Agent determine type of PSM in use. In step 634, if the PSM is of type that supports downloadable Subscriber Terminal features or services (e.g., types 2 or 3, 312 and 314 (FIG. 3) respectively), the Image Processing Agent 220 and/or Smart Card Agent 218 transmit a message instructing the PSM to download appropriate features to the subscriber terminal.

In step 636, if additional Subscriber Terminal features are available in accord with subscriber's service subscriptions but were not downloaded from the PSM, the Image Processing Agent 220 transmits the feature or service information to the subscriber terminal. In step 638, registration is complete and the method concludes.

FIG. 7 is a flow diagram showing an exemplary method 700 for use in conjunction with the telecommunications system of FIG. 1 for setting up a call origination on behalf of a subscriber. The subscriber is assumed to have registered in accord with the method of FIG. 6. The method begins in step 710, in which the calling Subscriber Terminal 410 receives from the subscriber a request to originate service. In step 712, the Subscriber Terminal 410 transmits a message to the Serving Agency 436 requesting initiation of service. The message includes information identifying the subscriber's PSM. In step 714, if the subscriber is non-local, and if the Home Network and Serving Network do not agree to allow the Serving Network to provide services to the subscriber based on subscriber information acquired upon registration, the Service Agent and/or Security Agent of the Serving Agency transmit an authorization request to the Home Agency. Otherwise, the method continues with step 718.

In step 716, if the Home Agency determines that the subscriber is authorized, the Home Agency's Service Agent and/or Security Agent transmit to the Serving Agency authorization messages describing services to which the subscriber is entitled, and optionally describing certain services which may be provided by the home network (via such elements as the home agency 588 (FIG. 5) or the home SPCC 586 (FIG. 5)) if such services are not directly available from the serving network.

In step 718, the Serving Agency's Service Agent and/or Smart Card Agent, based on information received in steps 624 (FIG. 6) or 716, cooperatively determine which image information may be provided to the serving SPCC 414 in order to provide services. In step 720, the Serving Agency's Service Agent and/or Smart Card Agent, based on information received in steps 624 (FIG. 6) or 716, cooperatively determine sources of image information which may be provided to the serving SPCC 414 in order to provide services. In step 722, the Serving Agency's Service Agent and/or Smart Card Agent, based on information received in steps 624 (FIG. 6) or 716, cooperatively determine whether a requested service may be provided by the serving SPCC 414, or must be provided by another SPCC, such as the home SPCC 586.

In step 724, the Serving Agency's Service Agent instructs the serving SPCC to create a Subscriber Service Image for the subscriber's service request. In step 726, if the Home network and Serving Network agree to allow services and features to be downloaded to serving SPCC 714 from the subscriber's PSM 412, and if the PSM contains such information, the Service Agent instructs the Subscriber Terminal 410 to acquire service and feature information (as determined in steps 718 and 720) from the PSM and forward it to the serving SPCC, which incorporates the information into the Subscriber Service Image.

In step 728, if additional service and feature information is required to enable the serving SPCC to provide the requested service, and such information has not been earlier acquired by the Serving Service Agent from the Home Service Agent, the Serving Service Agent requests the information from the Home Service Agent. (The information may be stored and forwarded by the Serving Service Agent, or may be transmitted directly to the SPCC by the Home Service Agent, passing through the Serving Service Agent only ephemerally.) In step 730, the appropriate Serving or Home Service Agent transmits to the SPCC any additional required service and feature information to SPCC, which incorporates the information into the Subscriber Service Image. The service and feature information may have been earlier acquired in steps 624 (FIG. 6) or 716.

In step 732, the Serving SPCC 414 initiates the requested service in accord with the Subscriber Service Image, using appropriate resources of the bearer network, such as network paths 458 (FIG. 4), 590, and 596 (FIG. 5). In step 734, if, as determined in step 722, none of the requested services or features must be provided by another SPCC, the method continues in step 738. Otherwise, an arrangement must be made with another SPCC to provide the requested features or services, and the method continues in step 736. In step 736, the Serving Agency 436 transmits a request to the Agency (e.g., Home Agency 588 (FIG. 5)) associated with the other SPCC 586 (FIG. 5) to initiate a negotiation to procure the requested services or features. Alternatively, the Serving Agency 436 may also negotiate directly with the other SPCC 586. In step 738, the Serving SPCC 414 extends a bearer path 590 (FIG. 5) to the other SPCC 586 (FIG. 5).

In step 740, the serving SPCC and/or the Serving Agency inform the Home Agency of initiation of service. In step 742, the requested services or features are provided to the subscriber.

In step 744, the serving SPCC 414 receives a request to terminate service. In step 746, the serving SPCC 714 forwards the termination request to any other involved SPCCs, or other network elements. In step 748 the serving SPCC releases the bearer path and other network resources under its control. In step 750, the serving SPCC and/or Serving Agency inform the Home Agency of termination of service. In step 752, the serving SPCC releases the Subscriber Service Image. In step 754, the Serving Agency releases records and resources relating to the services requested by the subscriber, but retains subscriber registration information. The method concludes in step 756.

FIG. 8 is a flow diagram showing an exemplary method 800 for use in conjunction with the telecommunications system of FIG. 1 for setting up an incoming call termination at SPCC 430 on behalf of a subscriber at subscriber terminal 432. The subscriber is assumed to have earlier registered in accord with the method of FIG. 6. The method begins in step 810, in which the Serving Agency 436 receives a request from another agency (e.g., originating agency 480 or intermediate agency 588) to provide a service, such as to terminate an incoming call, to a subscriber who has previously registered at a subscriber terminal 432. The request includes information identifying the subscriber's PSM 434.

In step 812, the originating or intermediate SPCC establishes a bearer path (e.g., 458 or 596) for service to the serving SPCC 430. In step 814, the Serving Agency 480 transmits an acknowledgement of the service request to the other agency. The method then continues with steps 714–756 as shown in FIG. 7.

In accord with a further aspect of the invention, the home agency maintains a database of service subscriptions for the subscriber and synchronizes the contents of the subscriber's PSM accordingly. The Home Agency, responsive to service change transactions from a service provider's service order entry, provisioning, and business support systems, transmits PSM update instructions to a subscriber terminal at which the subscriber has registered.

Figure 9A:
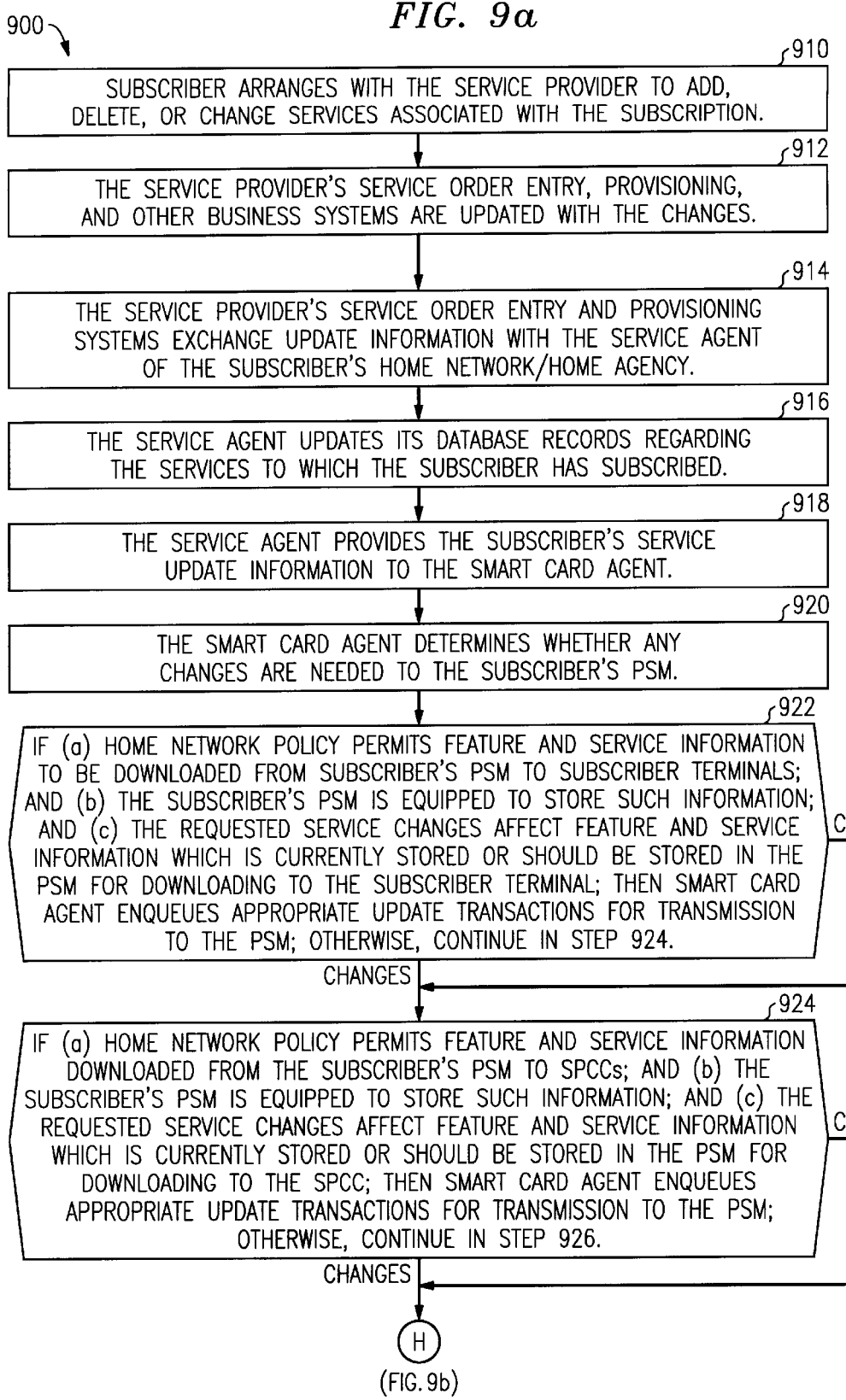
FIG. 9 is a flow diagram showing an exemplary method for use in conjunction with the telecommunications system of FIG. 1 for processing the addition, deletion, or other change of a user's subscription records and for maintaining corresponding information in the subscriber's Portable Subscriber Module.
Figure 9B:
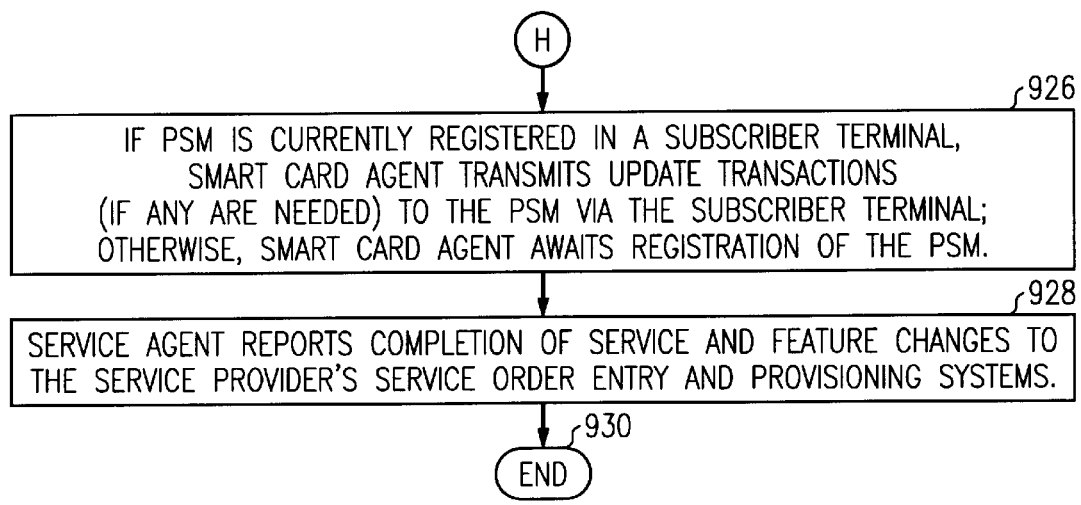

FIG. 9 is a flow diagram showing an exemplary method for use in conjunction with the telecommunications system of FIG. 1 for processing the addition, deletion, or other change of a user's subscription records and for maintaining corresponding information in the subscriber's Portable Subscriber Module. The method begins in step 910, in which the subscriber arranges with the service provider to add, delete, or change services associated with the subscription.

In step 912, the service provider's service order entry, provisioning, and other business systems are updated with the changes. In step 914, the service provider's service order entry and provisioning systems exchange update information with the Service Agent of the subscriber's Home Network/Home Agency. In step 916, the Service Agent updates its database records regarding the services to which the subscriber has subscribed.

In step 918, the Service Agent provides the subscriber's service update information to the Smart Card Agent. In step 920, the Smart Card Agent determines whether any changes are needed to the subscriber's PSM. In step 922, if (a) the Home Network's policy permits feature and service information to be downloaded from the subscriber's PSM to subscriber terminals; and (b) the subscriber's PSM is equipped to store such information; and (c) the requested service changes affect feature and service information which is currently stored or should be stored in the PSM for downloading to the subscriber terminal; then the Smart Card Agent enqueues appropriate update transactions for transmission to the PSM; otherwise continue in step the method continues with step 924.

In step 924, if (a) the Home Network's policy permits feature and service information to be downloaded from the subscriber's PSM to SPCCs; and (b) the subscriber's PSM is equipped to store such information; and (c) the requested service changes affect feature and service information which is currently stored or should be stored in the PSM for downloading to the SPCC; then the Smart Card Agent enqueues appropriate update transactions for transmission to the PSM; otherwise continue in step 926.

In step 926, if the PSM is currently registered in a Subscriber Terminal, the Smart Card Agent transmits update transactions (if any are needed) to the PSM via the Subscriber Terminal; otherwise, the Smart Card Agent awaits registration of the PSM. In step 928, the Service Agent reports the completion of service and feature changes to the service provider's service order entry and provisioning systems. The method concludes in step 930. The above-described embodiment of the invention is merely one example of a way in which the invention may be carried out. Other ways may also be possible and are within the scope of the following claims defining the invention.

What is claimed is:

1. A telecommunications system comprising:
   a subscriber terminal;
   a telecommunications exchange connected to said subscriber terminal;
   a telecommunications agency coupled to said telecommunications exchange; and
   an image storage facility coupled to said telecommunications exchange and adapted to store a plurality of subscriber service images, said images containing subscriber-related information and service/feature information needed by said telecommunications exchange to provide service to a plurality of respective subscribers, said service/feature information in at least a portion of the images defining service/features that are not native capabilities of the telecommunications exchange;
   said telecommunications agency being adapted to cause corresponding subscriber service images to be delivered to said image storage facility of said telecommunications exchange when said respective subscribers request service.

2. The telecommunications system of claim 1 wherein at least one of said subscriber service images includes information defining call processing steps to be executed by said telecommunications exchange in providing service to a subscriber.

3. The telecommunications system of claim 1 wherein at least one of said subscriber service images includes information describing instructions to be executed by a control element of said telecommunications exchange in providing service to a subscriber.

4. The telecommunications system of claim 1, further comprising a portable subscriber module adapted for connection to said subscriber terminal, said portable subscriber module and said subscriber terminal being adapted to deliver to said telecommunications exchange at least a portion of said subscriber service image.

5. The telecommunications system of claim 1 wherein the telecommunications agency comprises:
   a communications path adapted for intra-agency communications and for connection to at least one external network;
   a security agent coupled to said communications path; said security agent being adapted to provide determinations whether a subscriber is authorized to receive a requested telecommunications service;
   a service agent coupled to said communications path, said service agent being adapted to provide information about services available to a subscriber; and
   an image processing agent coupled to said communications path, said image processing agent being adapted to provide at least a portion of a subscriber service image on behalf of a subscriber.

6. The apparatus of claim 5 further comprising a billing agent coupled to said communications path, said billing agent being adapted to maintain billing information regarding services provided to a subscriber.

7. The apparatus of claim 5 further comprising a smart card agent coupled to said communications path, said smart card agent being adapted to maintain contents of a portable subscriber module of said subscriber.

8. The apparatus of claim 5, said service agent being coupled to a database facility for storing records regarding services available to a subscriber.

9. The apparatus of claim 5, said security agent being coupled to a database facility for storing records regarding authorization of a subscriber to receive services.

10. The apparatus of claim 5, said image processing agent being coupled to a database facility for storing records regarding subscriber service images for a subscriber.

11. The apparatus of claim 5, said agency being coupled via said communications path to an agency gateway, said agency gateway being adapted to facilitate communications with at least one other agency.

12. A telecommunications exchange comprising:
   an interface for coupling to at least one subscriber terminal;
   a control element;
   an image storage facility coupled to said control element and adapted to store a plurality of subscriber service images, said images containing subscriber-related information and service/feature information needed by said telecommunications exchange to provide service to a plurality of respective subscribers, said service/feature information in at least a portion of the images defining service/features that are not native capabilities of the telecommunications exchange;
   an interface for coupling to at least one telecommunications agency;
   said image storage facility being adapted to receive corresponding subscriber service images via one of said interfaces when said respective subscribers request service.

13. The telecommunications exchange of claim 12 being adapted to request that said telecommunications agency cause a subscriber service image to be delivered to said telecommunications exchange.

14. A method for delivering telecommunications service to a subscriber at a subscriber terminal in a telecommunications network comprising a telecommunications exchange, a subscriber terminal coupled to the telecommunications exchange, an image storage facility coupled to said telecommunications exchange and a telecommunications agency, the image storage facility adapted to store a plurality of subscriber service images, said images containing subscriber-related information and service/feature information needed by said telecommunications exchange to provide service to a plurality of respective subscribers, said service/feature information in at least a portion of the images defining service/features that are not native capabilities of the telecommunications exchange; the method comprising:
   (a) receiving a request for service;
   (b) said telecommunications exchange reporting to said telecommunications agency said request for service;
   (c) said telecommunications agency causing to be delivered to said telecommunications exchange a subscriber service image containing subscriber-related information and service/feature information needed by said telecommunications exchange to provide the requested service to said subscriber; and
   (d) said telecommunications exchange providing said requested service in accord with said subscriber service image.

15. The method of claim 14, wherein said subscriber service image includes information defining call processing steps to be executed by said telecommunications exchange in providing said service to a subscriber.

16. The method of claim 14, wherein said subscriber service image includes information describing instructions to be executed by a control element of said telecommunications exchange in providing a service to a subscriber.

17. The method of claim 14 wherein:
   step (a) thereof further comprises the step of:
   (a1) receiving as a part of said request information supplied by and identifying said subscriber;
   step (c) thereof further comprises the steps of:
   (c1) determining whether said subscriber is authorized to receive said service; and
   (c2) if said subscriber is authorized, transmitting a message to said telecommunications exchange enabling said telecommunications exchange to provide said service.

18. The method of claim 14 wherein step (a) thereof further comprises the step of:
   (a1) receiving as a part of said request information obtained from a portable subscriber module coupled to said subscriber terminal and identifying one of: said subscriber, a service of said subscriber, a subscription of said subscriber, or a portable subscriber module of said subscriber.

19. The method of claim 14 wherein step (c) thereof further comprises the steps of:
   (c1) determining whether said subscriber is authorized to receive said service; and
   (c2) if said subscriber is authorized, transmitting a message to said telecommunications exchange enabling said telecommunications exchange to provide said service.

20. The method of claim 14 wherein step (c) thereof further comprises the steps of:
   (c1) determining whether said telecommunications exchange includes capability to provide the requested service without further instruction; and
   (c2) if said telecommunications exchange includes capability to provide the requested service without further instruction, transmitting said at least a portion of said subscriber service image containing at least an indicia sufficient to unambiguously identify the requested service to said telecommunications exchange.

21. The method of claim 14 wherein step (c) thereof further comprises the steps of:
(c1) determining whether said telecommunications exchange includes capability to provide the requested service without further instruction; and
(c2) if said telecommunications exchange does not include capability to provide the requested service without further instruction, transmitting at least a portion of said subscriber service image containing at least one call processing step usable by said telecommunications exchange to provide the requested service.

22. The method of claim 14 wherein step (c) thereof further comprises the steps of:
(c1) determining whether said telecommunications exchange includes capability to provide the requested service without further instruction; and
(c2) if said telecommunications exchange does not include capability to provide the requested service without further instruction, transmitting an instruction to said subscriber terminal to cause a portable subscriber module coupled thereto to deliver to said telecommunications exchange at least a portion of a subscriber service image containing at least one call processing step usable by said telecommunications exchange to provide the requested service.

23. The method of claim 22 wherein step (c2) thereof further comprises the steps of:
(c2a) determining whether said subscriber terminal has coupled thereto a portable subscriber module;
(c2b) determining whether said portable subscriber module contains subscriber service image information usable by said telecommunications exchange to provide the requested service;
(c2c) determining whether a policy of a home network of said subscriber permits delivery of subscriber service information to said telecommunications exchange; and
(c2d) responsive to affirmative determinations in steps (c2a), (c2b) and (c2c), transmitting said instruction to said subscriber terminal.

24. The method of claim 14 wherein step (c) thereof further comprises the steps of:
(c1) determining whether said telecommunications exchange includes capability to provide the requested service without further instruction; and
(c2) if said telecommunications exchange does not include capability to provide the requested service without further instruction, transmitting an instruction to a portable subscriber module associated with said subscriber terminal to cause said portable subscriber module to deliver to said telecommunications exchange at least a portion of a subscriber service image containing at least one call processing step usable by said telecommunications exchange to provide the requested service.

25. The method of claim 24 wherein step (c2) thereof further comprises the steps of:
(c2a) determining whether said portable subscriber module contains subscriber service image information usable by said telecommunications exchange to provide the requested service;
(c2b) determining whether a policy of a home network of said subscriber permits delivery of subscriber service image information from a portable subscriber module to said telecommunications exchange; and
(c2c) responsive to affirmative determinations in steps (c2a) and (c2b), transmitting said instruction to said portable subscriber module.

26. The method of claim 14 wherein step (c) thereof further comprises the steps of:
(c1) determining whether said telecommunications exchange includes capability to provide the requested service; and
(c2) if said telecommunications exchange does not include capability to provide the requested service, transmitting to said telecommunications exchange an instruction to extend said call to a second telecommunications exchange having capability to provide the requested service.

27. The method of claim 14 further comprising the step of:
(c2a) transmitting to said second telecommunications exchange a subscriber service image enabling said telecommunications exchange to provide the requested service.

28. The method of claim 14 further comprising the step of:
(c2a) transmitting to said second telecommunications exchange a message authorizing said telecommunications exchange to provide the requested service.

29. The method of claim 14 further comprising the step of:
said telecommunications agency transmitting to said subscriber terminal at least a portion of a subscriber service image including information usable by said subscriber terminal to customize its behavior in accord with a service to which said subscriber has subscribed.

30. The method of claim 14 further comprising the step of:
said telecommunications agency transmitting to said subscriber terminal an instruction for an associated portable subscriber module to provide to said subscriber terminal at least a portion of a subscriber service image including information usable by said subscriber terminal to customize its behavior in accord with a service of said subscriber.

* * * * *